(12) United States Patent
Venkataramani et al.

(10) Patent No.: US 9,846,571 B1
(45) Date of Patent: Dec. 19, 2017

(54) UTILIZING CLOCK RATE PIPELINING TO GENERATE CODE FOR MULTI-RATE SYSTEMS

(71) Applicant: The MathWorks, Inc., Natick, MA (US)

(72) Inventors: Girish Venkataramani, Boston, MA (US); Yongfeng Gu, Brookline, MA (US); Wang Chen, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 518 days.

(21) Appl. No.: 14/596,443

(22) Filed: Jan. 14, 2015

Related U.S. Application Data

(63) Continuation-in-part of application No. 14/185,510, filed on Feb. 20, 2014, now Pat. No. 9,256,405.

(60) Provisional application No. 61/770,763, filed on Feb. 28, 2013, provisional application No. 61/770,767, filed on Feb. 28, 2013.

(51) Int. Cl.
*G06F 9/44* (2006.01)
*G06F 11/36* (2006.01)

(52) U.S. Cl.
CPC ............ *G06F 8/35* (2013.01); *G06F 11/3672* (2013.01)

(58) Field of Classification Search
CPC . G06F 9/30181; G06F 9/3851; G06F 17/5022

USPC .................... 703/21; 712/220, 229
See application file for complete search history.

(56) References Cited

U.S. PATENT DOCUMENTS

| 7,809,932 B1* | 10/2010 | Barry ................. G06F 9/30145 |
| | | 712/229 |
| 8,291,201 B2* | 10/2012 | Schwinn ............... G06F 1/3203 |
| | | 712/229 |

OTHER PUBLICATIONS

Wikipedia, "Retiming", http://en.wikipedia.org/wiki/Retiming, Mar. 16, 2013, 3 pages.
Altera Wiki, "DSPBA Basics", http://www.alterawiki.com/wiki/DSPBA_Basics, Oct. 11, 2011, 3 pages.

* cited by examiner

*Primary Examiner* — Andy Ho
(74) *Attorney, Agent, or Firm* — Harrity & Harrity, LLP

(57) ABSTRACT

A device generates a model associated with a multi-rate system. The multi-rate system includes a system associated with a clock rate and a sample rate, and the clock rate is greater than the sample rate. The device identifies the clock rate of the multi-rate system based on the model, and identifies a portion, of the model, associated with the sample rate. The device applies clock rate pipelining to adjust the sample rate associated with the portion of the model so that the sample rate substantially equals the clock rate, and generates code associated with the model and the applied clock rate pipelining.

20 Claims, 21 Drawing Sheets

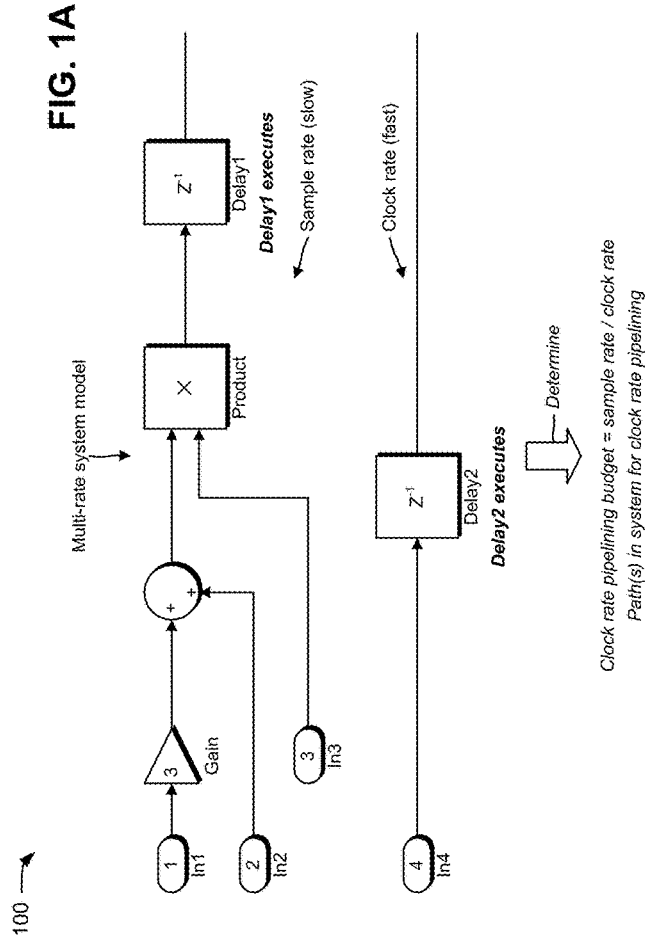

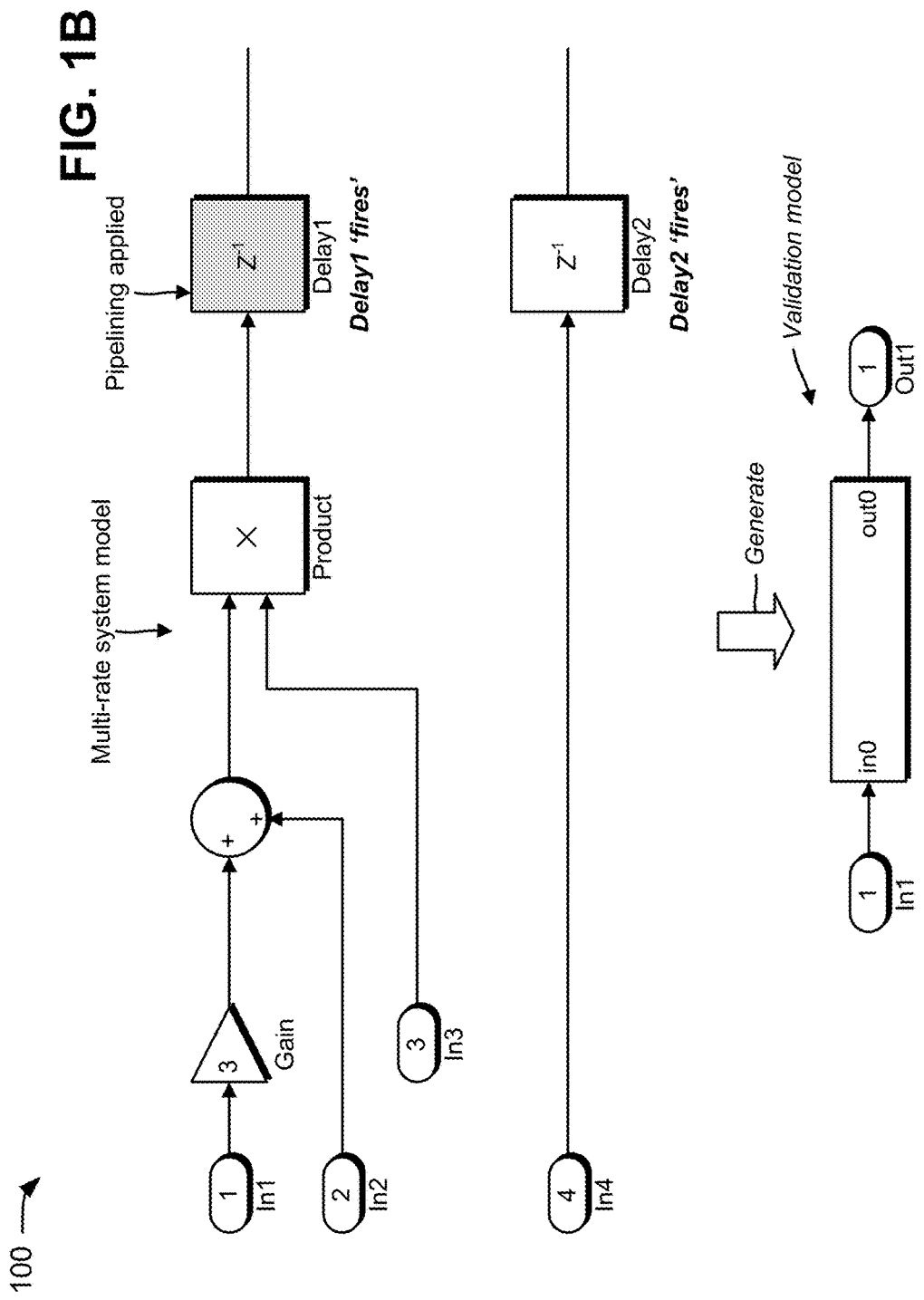

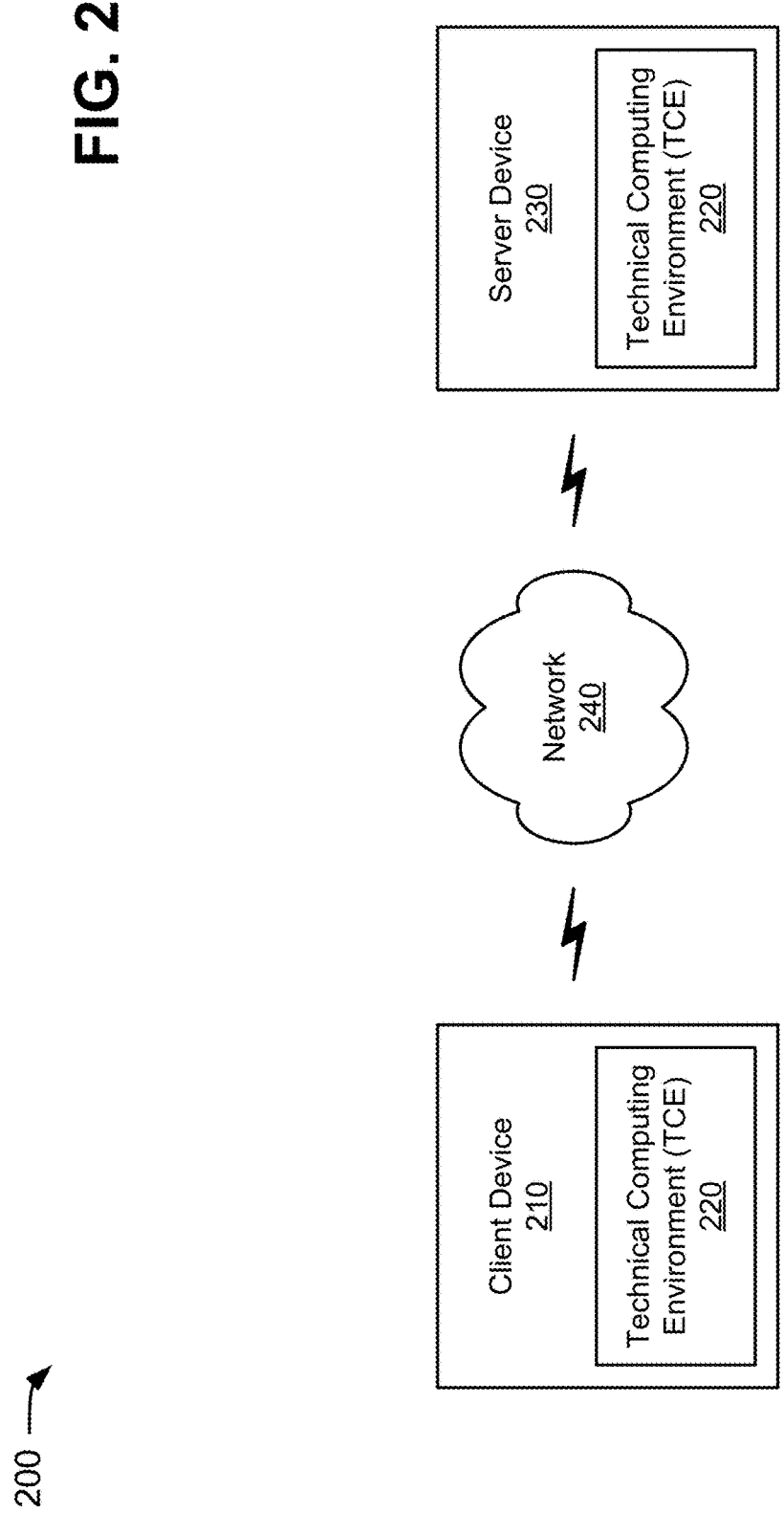

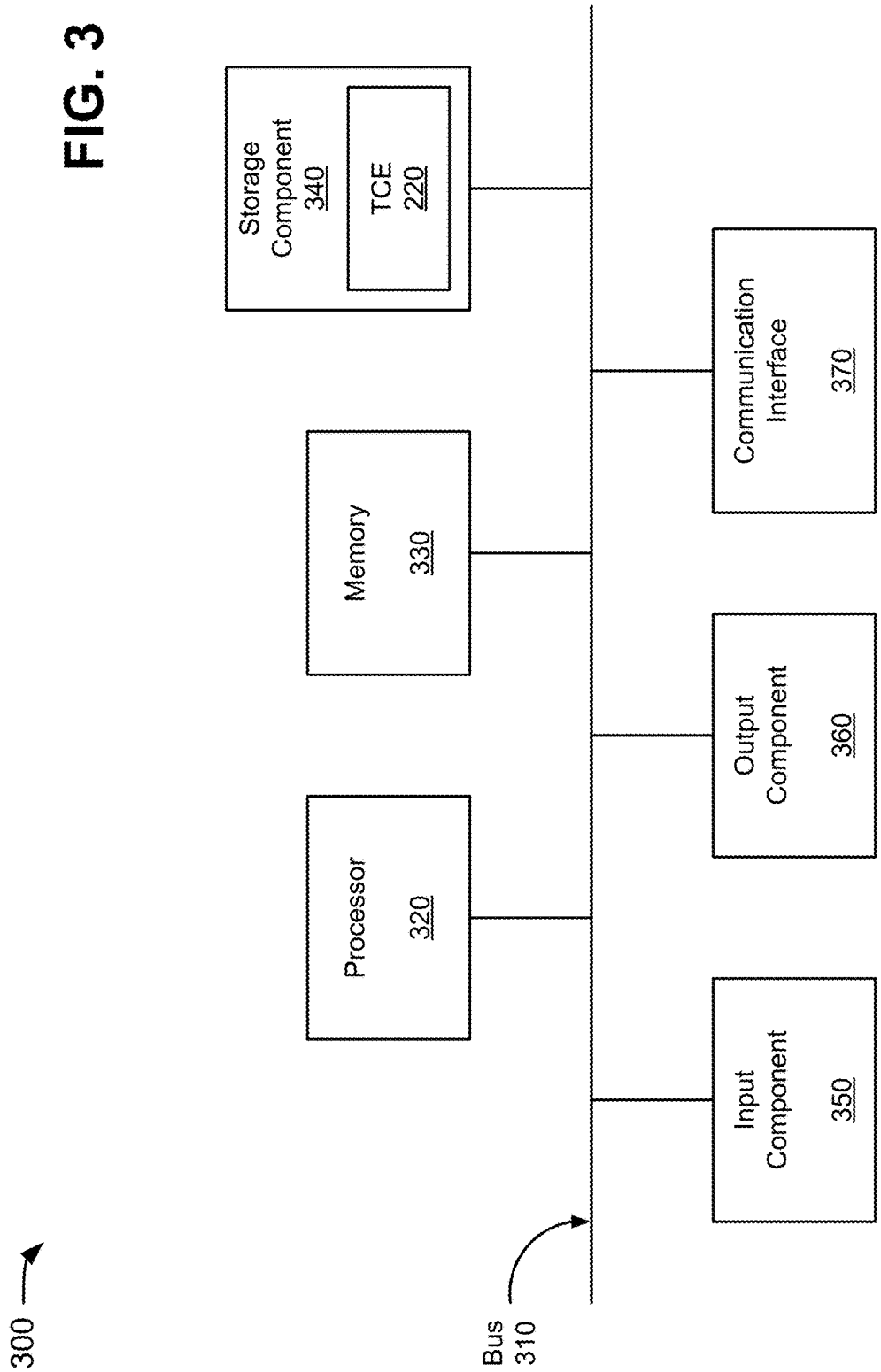

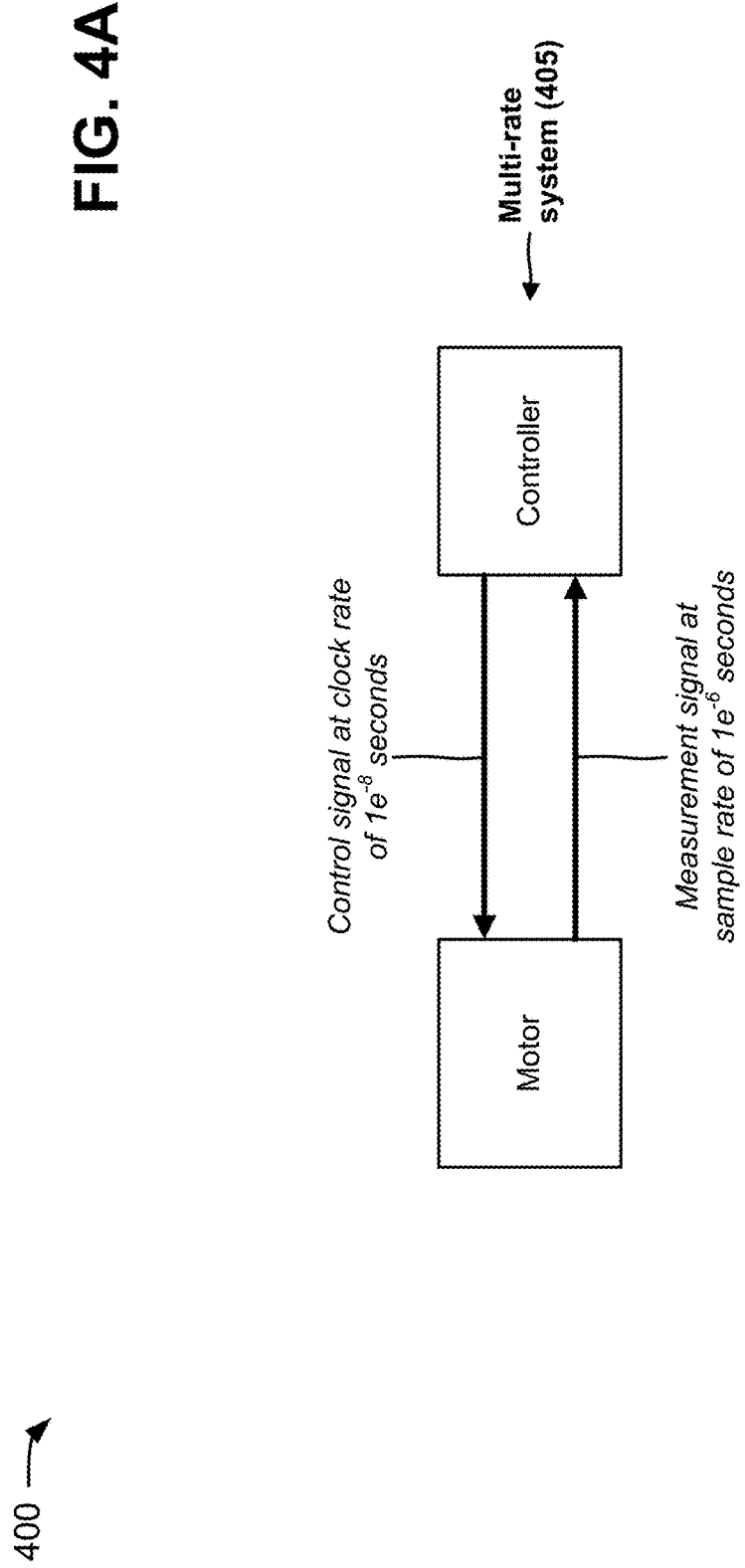

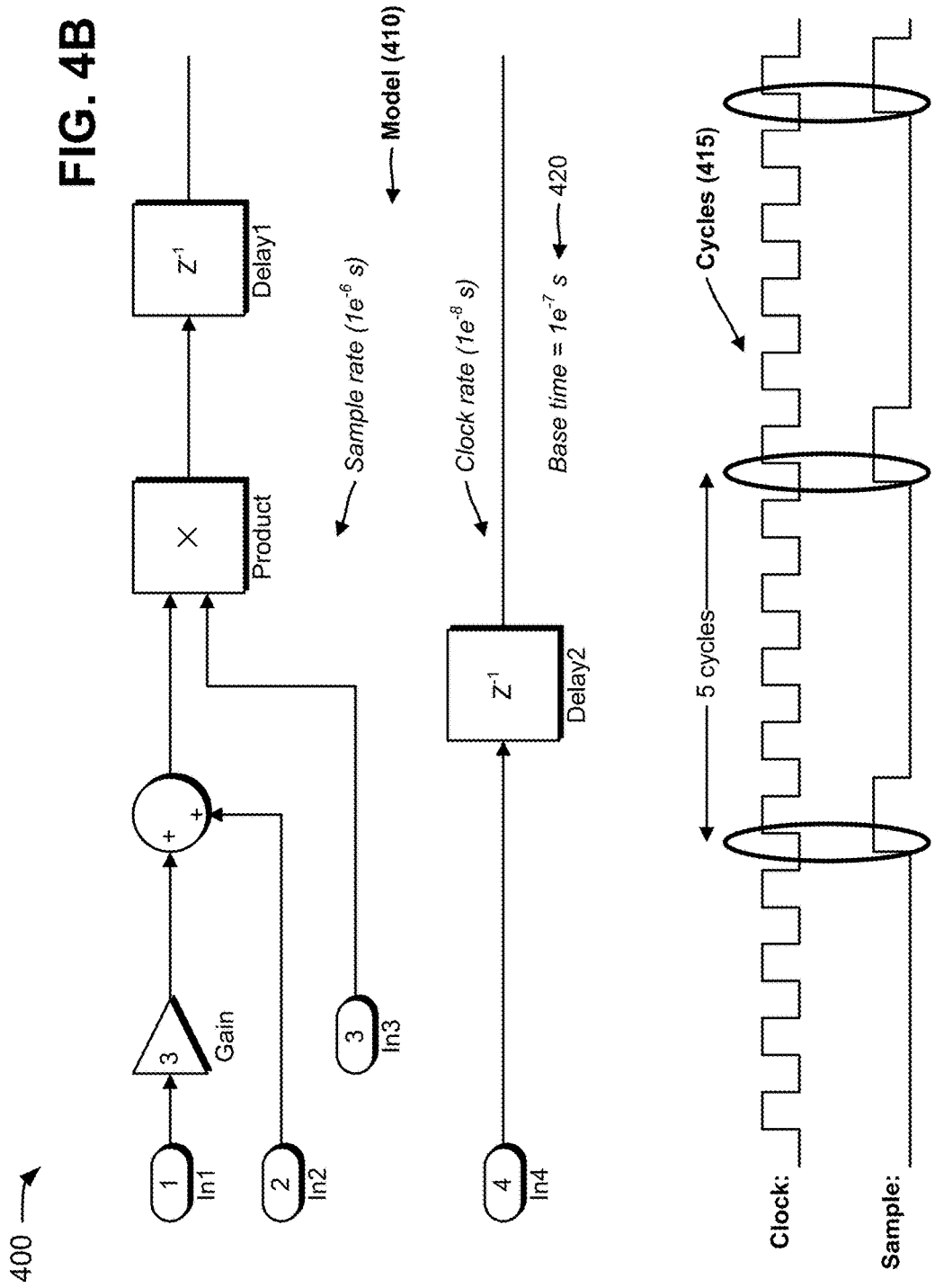

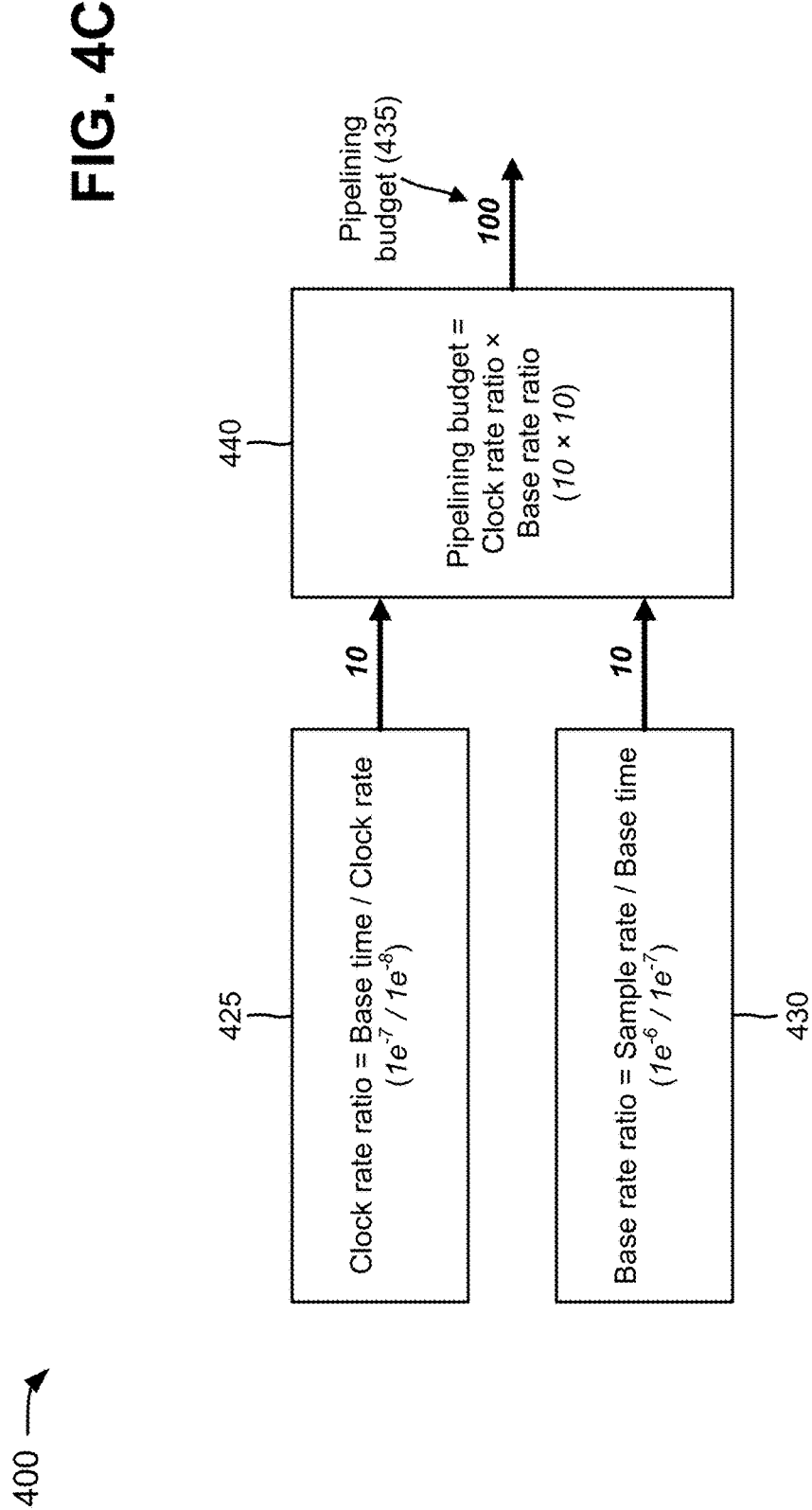

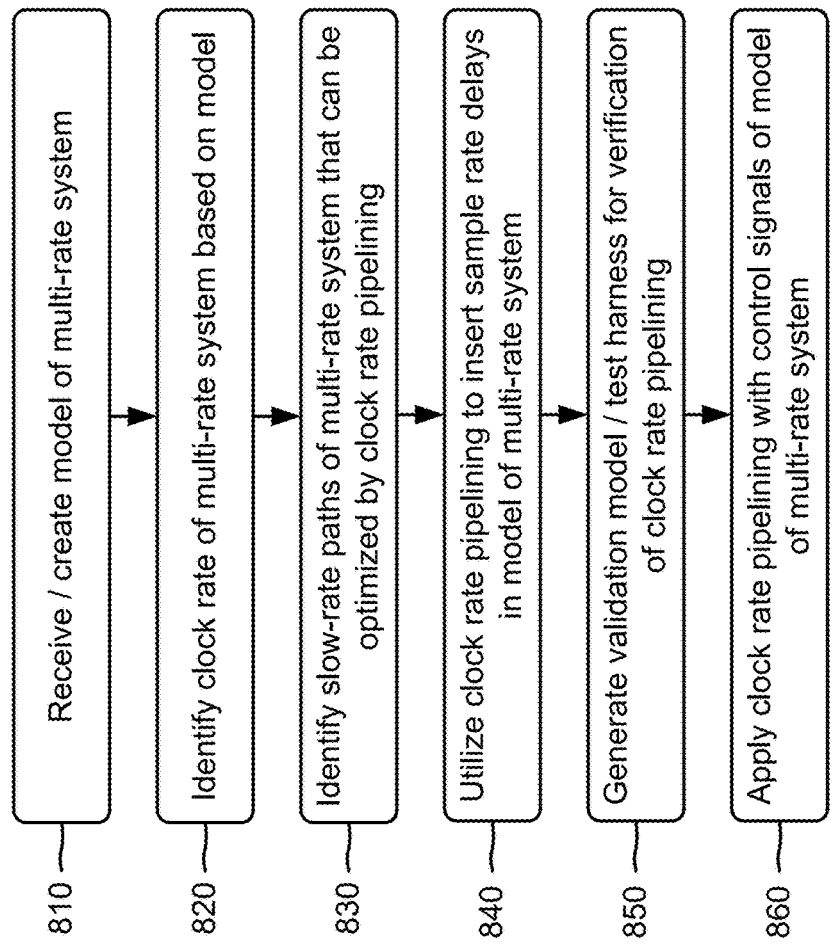

UTILIZING CLOCK RATE PIPELINING TO GENERATE CODE FOR MULTI-RATE SYSTEMS

RELATED APPLICATION

This application is a continuation-in-part (CIP) of U.S. patent application Ser. No. 14/185,510, filed on Feb. 20, 2014, which is a non-provisional application claiming priority to U.S. Provisional Patent Application Nos. 61/770,763 and 61/770,767, filed Feb. 28, 2013. The entire contents of U.S. patent application Ser. No. 14/185,510 and U.S. Provisional Patent Application Nos. 61/770,763 and 61/770,767 are incorporated herein in their entireties.

BRIEF DESCRIPTION OF THE DRAWINGS

FIGS. 1A and 1B are diagrams of an overview of an example implementation described herein;

FIG. 2 is a diagram of an example environment in which systems and/or methods, described herein, may be implemented;

FIG. 3 is a diagram of example components of one or more devices of FIG. 2;

FIGS. 4A-4D are diagrams of an example implementation of modeling and determining clock rate pipelining for a multi-rate system;

FIG. 8 is a flow chart of an example process for utilizing clock rate pipelining in a model for a multi-rate system.

DETAILED DESCRIPTION

Figure 4D:
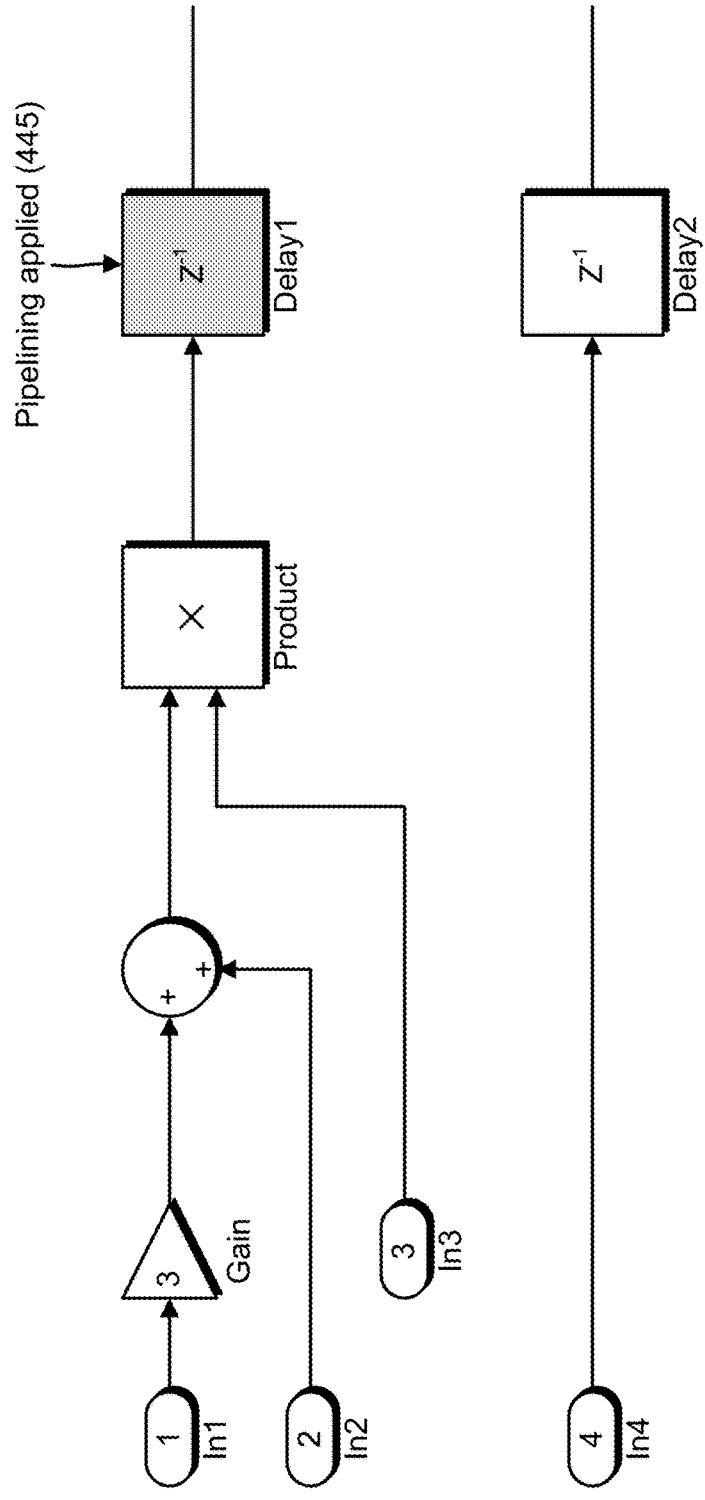

The following detailed description of example implementations refers to the accompanying drawings. The same reference numbers in different drawings may identify the same or similar elements.

A client device, such as a computer, may receive a model of a system to be implemented on a target platform (e.g., digital hardware). Prior to implementing the model on the target platform, the client device may optimize the model to be better suited for the target platform. To optimize the model, the client device may insert an additional quantity of delay into the model (e.g., additional seconds, additional cycles, or the like). For example, the client device may insert delay into the model to increase a clock speed associated with the model, to permit a resource associated with the model to be shared by two or more model elements, to introduce a model element having a greater quantity of delay (e.g., delay that is greater than a delay of a model element being replaced), or the like.

However, inserting delay into the model may change the behavioral characteristics of the model. For example, inserting delay into the model may affect the operation of some model elements, such as feedback loops, where the total delay associated with the model element must remain constant. Additionally, inserting delay in the model may increase latency associated with the model (e.g., a measure of delay experienced by the model) beyond a maximum latency allowed in the model (e.g., due to a constraint). Thus, where introducing delay into the model may affect the behavioral characteristics of the model, the client device may not be able to modify the model for optimization (e.g., compared to if the delay were inserted).

Furthermore, the system being modeled may include a multi-rate system, such as a control loop application where samples are arriving at a controller at a slow rate (e.g., a 25 kilohertz (KHz) sample rate) and the controller includes a fast rate (e.g., a 50 megahertz (MHz) clock rate). If the multi-rate system is modeled based on the slow rate, certain optimizations may not be enabled (e.g., pipelining, resource sharing, or the like). If the multi-rate system is modeled based on the fast rate, a simulation speed of the model may be slowed down (e.g., latency may be increased). The controller may be implemented on a field-programmable gate array (FPGA), or an embedded processor, with a clock rate (e.g., 50 MHz) that is much faster than the sample rate. In the model, an algorithm designer may wish to model the controller logic at the slower sample rate. While modeling the controller logic at the slower sample rate captures the correct numeric and algorithmic detail, such modeling also results in a fast simulation that may not translate into a good hardware implementation of the controller logic. When the algorithm designer provides the model to a hardware engineer, the hardware engineer may wish to utilize a more efficient implementation of the controller logic on the FPGA using scheduling, pipelining, and resource sharing of the control algorithm. This means that the controller logic should be modeled at the clock rate, which substantially slows down simulation time.

Systems and/or methods, described herein, may allow a client device to automatically recognize a rate differential in a model of a multi-rate system, and to automatically insert a quantity of delay into portions of the model without affecting the overall behavioral characteristics of the model and/or the portions of the model (e.g., without altering the latency of the model).

FIGS. 1A and 1B are diagrams of an overview of an example implementation 100 described herein. Example implementation 100 may be performed by a client device, such as a computer, that automatically recognizes a rate differential in a block diagram model of a multi-rate system, and automatically inserts a quantity of delay (e.g., clock rate pipelines) into portions of the multi-rate system model.

As shown in FIG. 1A, the client device may receive the block diagram model or may create the block diagram model based on a multi-rate system. A first (top) portion of the multi-rate system model may be associated with a sample rate (e.g., a slow rate at which information in the multi-rate system model is sampled), and a second (bottom) portion of the multi-rate system model may be associated with a clock rate (e.g., a rate faster than the sample rate and associated with a frequency at which a processor is executing). As further shown in FIG. 1A, the first portion of the multi-rate system model may include a first delay block (Delay1), and the second portion of the multi-rate system model may include a second delay block (Delay2). Since the clock rate is faster than the sample rate, the second delay block may execute multiple times before the first delay block executes.

The client device may identify the clock rate of the multi-rate system based on the multi-rate system model, and may identify slow-rate paths, of the multi-rate system, that may be optimized by clock rate pipelining. A pipeline may include a set of elements (e.g., processors, threads, co-routines, or the like) arranged so that an output of a first element may be an input of a second element. A processing device (e.g., a microprocessor) may perform pipelining by starting execution of the second element before completing execution of the first element (e.g., by permitting a set of instructions in the pipeline concomitantly, with a first instruction at a different stage of execution than a second instruction). The client device may also determine a clock rate pipelining budget based on the sample rate and the clock rate. The clock rate pipelining budget may include a number of clock cycles that the client device may have before executing one or more portions of the multi-rate system model and without introducing new latencies in the multi-rate system model.

The client device may utilize the clock rate pipelining to insert a quantity of delay into the multi-rate system model (e.g., via a delay block). Based on the modified data rate, the first portion of the multi-rate system model, associated with sampling operations, may complete additional cycles prior to completion of operations associated with the second portion of the multi-rate system model. For example, as shown in FIG. 1B, the client device may apply the clock rate pipelining to the first delay block so that the first delay block executes at or around a time when the second delay block executes. In this manner, the client device may add a quantity of cycles of operation to the first portion of the model to permit the behavioral characteristics of the second portion of the model to be unchanged when a delay is inserted.

As further shown in FIG. 1B, the client device may generate a validation model and/or a test harness for the multi-rate system model. The validation model and/or test harness may be utilized by the client device to verify the application of the clock rate pipelining to the multi-rate system model. If the multi-rate system model includes control signals that inform upstream blocks that data is valid and/or inform downstream blocks that an upstream block is ready for new data, the client device may apply clock rate pipelining with such control signals, in some implementations.

Systems and/or methods, described herein, may utilize clock rate pipelining to generate an optimized model (e.g., code) for a multi-rate system. The systems and/or methods may automatically recognize a rate differential in a model of a multi-rate system, and may automatically insert a quantity of delay (e.g., clock rate pipelines) into portions of the model without affecting the overall behavioral characteristics of the model and/or the portions of the model (e.g., without altering the latency of the model).

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing program information, such as information associated with a model. For example, client device 210 may include a computing device, such as a desktop computer, a laptop computer, a tablet computer, a handheld computer, a server, a mobile phone (e.g., a smart phone, a radiotelephone, or the like), or a similar device. In some implementations, client device 210 may receive information from and/or provide information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

For example, TCE 220 may provide mathematical functions and/or graphical tools (e.g., for creating plots, surfaces, images, volumetric representations, or the like). In some implementations, TCE 220 may provide these functions and/or tools using toolboxes (e.g., toolboxes for signal processing, image processing, data plotting, parallel processing, or the like). In some implementations, TCE 220 may provide these functions as block sets or in another way, such as via a library, a local or remote database (e.g., a database operating in a computing cloud), remote procedure calls (RPCs), an application programming interface (API), or the like.

TCE 220 may include a modeling system that may be used in the creation of a functional model and that may enable generation of executable code based on the model. For example, TCE 220 may include a graphical modeling tool or application that provides a user interface for a numerical computing environment. Additionally, or alternatively, TCE 220 may include a graphical modeling tool and/or application that provides a user interface for modeling and simulating (e.g., by executing a model) a dynamic system (e.g., based on differential equations, difference equations, discrete events, discrete states, or the like). Execution of a model to simulate a system may also be referred to as simulating a model. The model may further include static relations (e.g., algebraic relations, stochastic relations, inequalities, or the like).

Server device 230 may include one or more devices capable of receiving, generating, storing, processing, and/or providing information, such as information associated with a model. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), or the like), a microprocessor, and/or any processing component (e.g., a field-programmable gate array (FPGA), an application-specific integrated circuit (ASIC), or the like) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, or the like) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, or the like), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, or the like). Additionally, or alternatively, input component 350 may include a sensor for sensing information (e.g., a global positioning system (GPS) component, an accelerometer, a gyroscope, an actuator, or the like). Output component 360 may include a component that provides output information from device 300 (e.g., a display, a speaker, one or more light-emitting diodes (LEDs), or the like).

Communication interface 370 may include a transceiver-like component (e.g., a transceiver, a separate receiver and transmitter, or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4D are diagrams of an example implementation 400 of modeling and determining clock rate pipelining for a multi-rate system. As shown in FIG. 4A, a multi-rate system 405 may include a motor control loop system that includes a motor and a controller (e.g., an FPGA, an ASIC, or the like) for the motor. In some implementations, multi-rate system 405 may include another type of system, such as an information system (e.g., a digital control system, a signal processing system, or the like); a technical system (e.g., an airplane wing system); a natural system (e.g., human organ, a plant, or the like); a physical system (e.g., a bouncing ball); or the like. The controller may measure outputs (e.g., samples) of the motor via a measurement signal. The measurement signal may be received by the controller at a particular sample rate that includes a quantity of samples per unit time (e.g., seconds). For example, assume that the controller receives the measurement signal at a sample rate of $1e^{-6}$ seconds.

As further shown in FIG. 4A, the controller may control operation of the motor via a control signal. The control signal may be generated by the controller at a particular clock rate (e.g., $1e^{-8}$ seconds) associated with a clock signal. The clock signal may include a signal used to coordinate the actions of multi-rate system 405, and may be produced by a clock generator. The clock rate may represent a measure of a speed of multi-rate system 405, and may be associated with a frequency of the clock signal associated with the controller. In some implementations, the clock rate may be greater than the sample rate. For example, the controller may be capable of processing information at a particular clock rate (e.g., 50 MHz, or 50,000,000 cycles per second). A particular sample rate (e.g., 25 KHz, or 25,000 cycles per second) associated with the controller, however, may be less than the clock rate (e.g., by a factor of 2,000).

As shown in FIG. 4B, client device 210 (e.g., via TCE 220) may create and/or receive a model 410 that is based on multi-rate system 405. In some implementations, client device 210 may receive model 410 from a storage device (e.g., memory 330 and/or storage component 340, FIG. 3). In some implementations, model 410 may be stored in a data structure associated with client device 210, and client device 210 may receive model 410 by accessing the data structure.

In some implementations, model 410 may include a set of model elements that, when executed on client device 210, simulates behavior of multi-rate system 405. For example, multi-rate system 405 may include a set of physical elements that correspond to portions and/or components of multi-rate system 405. Multi-rate system 405 may be a dynamic system that changes its state, for example, as time progresses. The model elements may correspond to physical elements and may, when executed, simulate the behavior of the physical elements and/or multi-rate system 405.

In some implementations, model 410 may include a block diagram model. The block diagram model may include one or more blocks (e.g., model elements) that represent an operation of a component of multi-rate system 405 (e.g., adding, subtracting, multiplying, or the like). The blocks may be connected via one or more signal lines (e.g., lines for carrying a signal associated with the blocks). A parameter may describe the behavior of a block in the context of the block diagram model, and may influence a manner in which the block behaves, when executed. For example, the parameter may identify an input to the block (and/or a system represented by the block), an output from the block, a manner in which the input is processed by the block, a manner in which the output is generated by the block, a state associated with the block, and/or other information that describes a behavior of the block.

In some implementations, the block diagram model may be represented graphically, textually, and/or stored in some form of internal representation. For example, a particular visual depiction may be used to represent the block, such as in a graphical model (e.g., a graphical block diagram).

In some implementations, the graphical model may include entities with relationships between the entities, and the relationships and/or the entities may be associated with attributes. The entities may include model elements, such as blocks and/or ports. The relationships may include model elements, such as lines (e.g., connector lines) and references (e.g., textual labels). The attributes may include value information and meta information for the model element associated with the attributes. In some implementations, the graphical model may be associated with configuration information. The configuration information may include information for the graphical model, such as model execution information (e.g., numerical integration schemes, fundamental execution period, or the like), model diagnostic information (e.g., whether an algebraic loop should be considered an error or result in a warning), model optimization information (e.g., whether model elements should share memory during execution), model processing information (e.g., whether common functionality should be shared in code that is generated for a model), or the like.

In some implementations, the graphical model may have executable semantics and/or may be executable. An executable graphical model may be a time based block diagram. A time based block diagram may include, for example, blocks connected by lines (e.g., connector lines). The blocks may include elemental dynamic systems, such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), or the like. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, or the like), or the like. The attributes may include meta information, such as sample times, dimensions, complexity (whether there is an imaginary component to a value), data type, or the like, associated with the model elements.

In some implementations, one or more elements of model 410 (e.g., the graphical model) may be associated with a sample time, the sample rate (e.g., $1e^{-6}$ seconds), and/or the clock rate (e.g., $1e^{-8}$ seconds). For example, the graphical model may include a block with a continuous sample time, such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed-step integration) or may be variable during an execution (e.g., variable-step integration).

In some implementations, model 410 may include blocks with discrete sample times, such as unit delay blocks (e.g., Delay1 and Delay2) that may output values of corresponding inputs after specific delays, as shown in FIG. 4B. These delays may be time intervals and the time intervals may determine sample times of the delay blocks. During execution, a unit delay block may be evaluated each time the execution time has reached a point in time where an output of the unit delay block may change. These points in time may be statically determined based on a scheduling analysis of the graphical model before starting execution.

As further shown in FIG. 4B, a first delay block (Delay1) may be associated with the sample rate, and a second delay block (Delay2) may be associated with the clock rate. As such, the first delay block may execute after every five (5) clock cycles, and the second delay block may execute after every clock cycle, as indicated by reference number 415. Therefore, the second delay block may execute five times before the first delay block executes. Further, assume that the second delay block is associated with a base sampling time of $1e^{-7}$ seconds, as indicated by reference number 420 in FIG. 4B.

In some implementations, client device 210 may identify the clock rate of multi-rate system 405 based on information associated with model 410 (e.g., user inputs for model 410, information associated with blocks of model 410, or the like). For example, client device 210 may determine that the clock rate of multi-rate system 405 is $1e^{-8}$ seconds. In some implementations, client device 210 may determine a pipelining budget for model 410 based on the sample rate, the clock rate, and the base time associated with model 410. The pipelining budget may include an amount of time (e.g., a number of clock cycles) that client device 210 may have before executing one or more portions of model 410 and without introducing new latencies in model 410.

In some implementations, client device 210 may calculate the pipelining budget based on computation of a clock rate ratio and a base rate ratio for model 410. For example, as shown in FIG. 4C, client device 210 may calculate the clock rate ratio (e.g., 10) by dividing the base time (e.g., $1e^{-7}$ seconds) by the clock rate (e.g., $1e^{-8}$ seconds), as indicated by reference number 425. Client device 210 may calculate the base rate ratio (e.g., 10) by dividing the sample rate (e.g., $1e^{-6}$ seconds) by the base time (e.g., $1e^{-7}$ seconds), as indicated by reference number 430. Client device 210 may calculate a pipelining budget 435 (e.g., 100 clock cycles) by multiplying the clock rate ratio (e.g., 10) and the base rate ratio (e.g., 10), as indicated by reference number 440.

In some implementations, client device 210 may partition model 410 into one or more portions (e.g., combinational sub-graphs). Client device 210 may calculate a pipelining budget for each combinational sub-graph of model 410, and may insert one or more pipelines in each combinational sub-graph of model 410. Client device 210 may insert an upsample (repeat) block at an entry point of each combinational sub-graph of model 410, may utilize end-point delay associated with each combinational sub-graph of model 410, and may insert a downsample block at an exit point of each combinational sub-graph of model 410. In some implementations, client device 210 may upsample and downsample at boundaries of model 410 based on pipelining budget 435. For example, if the sample rate to clock rate ratio is 100, then pipelining budget 435 may be 100 and client device 210 may upsample and downsample the boundaries of model 410 by 100 times. However, if a slow rate path that is pipelined uses only 5 delays, then, to save power, client device 210 may optionally upsample and downsample the boundaries of model 410 by 5 times. Such a design may not change timing and/or latency for model 410, but may reduce power overhead.

In some implementations, after calculating pipelining budget 435, client device 210 may utilize clock rate pipelining to insert sample rate delays in model 410 of multi-rate system 405. For example, as shown in FIG. 4D, client device 210 may apply clock rate pipelining (e.g., by inserting delays) to the first delay block, as indicated by reference number 445, so that the first delay block executes at or around the same time that the second delay block executes. In some implementations, client device 210 may automatically identify design delays (e.g., delays caused by the sample rate) in model 410 and pipeline delays (e.g., delays caused by the clock rate) associated with model 410. In some implementations, client device 210 may automatically identify the design delays and/or the pipeline delays by use of an application (e.g., a computer program) that analyzes the association of model elements (e.g., via a graph traversal). Based on the association between model elements, client device 210 may determine a combination of model elements (e.g., between an input signal and an output signal) that is not associated with a sequential element (e.g., a delay element). Based on the determination of model elements, client device 210 may determine the design delays and/or the pipeline delays.

In some implementations, client device 210 may apply clock rate pipelining to address the design delays in model 410 (e.g., delay blocks, filters, discrete transfer functions, persistent variables, states, or the like) and/or to address design delays updated at the sample rate (e.g., the slow rate). In some implementations, client device 210 may apply clock rate pipelining to sustain a high clock frequency and to address operations in hardware that require a long time to execute (e.g., floating point operations), pipeline delays associated with model 410 (e.g., input/output pipeline delays, floating point pipelines, sharing/streaming, RAM mapping, or the like), and/or pipeline delays updated at the clock rate (e.g., the fast rate).

In some implementations, the clock rate pipelining may be applied to any pipelining that provides optimization to model 410. For example, the clock rate pipelining may be applied to input/output pipelining, distributed pipelining, RAM mapping, resource sharing, streaming, loop streaming, iterative numerical algorithms, multi-cycle HDL implementations (e.g., floating-point mapping), or the like.

In some implementations, the clock pipelining may include inserting an upsampling block in model 410. The upsampling block may include a model element that increases the data rate of a signal (e.g., that generates a modified data rate that is greater than an input data rate). Additionally, or alternatively, the clock pipelining may include inserting a downsampling block. The downsampling block may include a model element that decreases the data rate of a signal (e.g., that generates a modified data rate that is less than an input data rate).

In some implementations, client device 210 may place the sampling blocks at signal lines entering and/or exiting a portion of model 410. For example, client device 210 may place an upsampling block at a signal line entering the portion of model 410 (e.g., client device 210 may upsample a signal input). Additionally, or alternatively, client device 210 may place a downsampling block at a signal line exiting the portion of model 410 (e.g., client device 210 may downsample a signal output). In some implementations, client device 210 may upsample all signals entering the portion of model 410, and may downsample all signals exiting the portion of model 410. Additionally, or alternatively, client device 210 may upsample a signal to the same extent client device 210 may downsample the signal (e.g., an upsampling rate may match a downsampling rate). In this manner, a data rate of a signal entering the portion of model 410 may be the same as a data rate of a signal exiting the portion of model 410.

In some implementations, the downsampling block may consume a quantity of delay. For example, the downsampling block may consume one unit of delay (e.g., one cycle) when inserted in the model.

In some implementations, client device 210 may determine a first set of sampling blocks associated with a first portion of model 410, a second set of sampling blocks associated with a second portion of model 410, a third set of sampling blocks associated with a third portion of model 410, and so forth. In some implementations, an upsampling rate and/or a downsampling rate associated with the first set of sample blocks may be different from an upsampling rate and/or a downsampling rate associated with the second set of sampling blocks, the third set of sampling blocks, and so forth.

In some implementations, client device 210 may determine the sampling factor based on user input. For example, a user (e.g., of client device 210) may provide input that identifies a value for the upsampling and/or downsampling.

In some implementations, client device 210 may select a phase (e.g., an offset) of the signal to upsample and/or downsample (e.g., a phase of the input signal, a phase of the output signal, or the like). For example, model 410 may include a signal associated with a first data rate. Client device 210 may upsample the signal by a sampling factor of 10 (e.g., via an upsampling block) to produce a second data rate (e.g., an upsampled data rate). The second data rate may sample the signal an additional 10 times (e.g., may determine an additional 10 samples) per every 1 time the signal is sampled prior to upsampling. Client device 210 may downsample the signal (e.g., associated with the second data rate) by the sampling factor by selecting one of the 10 samples (e.g., related to a phase) to output (e.g., to return the signal to the first data rate).

In some implementations, based on the phase, client device 210 may determine a maximum longest path delay that may be inserted into the portion of model 410. The maximum longest path delay may include a maximum delay associated with a path in the portion of model 410 such that the delay to be inserted in the path does not exceed k−1 (e.g., the maximum longest path delay does not exceed one less than the sampling factor). For example, client device 210 may determine a sampling factor of 20 associated with a signal (e.g., a signal exiting the region of interest). Based on the sampling factor, client device 210 may downsample the signal at a particular phase (e.g., a $20^{th}$ phase), and may insert a maximum longest path delay based on the particular phase (e.g., a delay of 19 cycles).

In some implementations, client device 210 may automatically determine k based on a quantity of delay to be inserted into a path of model 410 (e.g., a quantity of cycles to be allocated to the path). For example, assume that the delay to be inserted in the path is 14 cycles. Based on the quantity of delay, client device 210 may determine that the sampling factor is to be 15, such that the delay to be inserted (e.g., 14 cycles) does not exceed k−1 (e.g., 15 cycles minus 1 cycle). Based on the delay, and based on the sampling factor, client device 210 may select the $15^{th}$ phase of the signal when downsampling.

In some implementations, another type of optimization may be applied to model 410, such as, for example, resource sharing, adding model elements associated with additional delay, or the like. In some implementations, the optimization may include modifying model 410 to reduce an amount of hardware needed, to increase a speed of multi-rate system 405, to remove redundancy, or the like. For example, client device 210 may identify a target platform to implement model 410 (e.g., based on a model type). In some implementations, the target platform may include digital hardware that may be customized for a particular use, such as a FPGA, an ASIC, or the like. Based on the target platform, client device 210 may determine how model 410 is to be modified to be implemented on the target platform.

In some implementations, the optimization may include identifying a quantity of delay to be inserted into model 410 (e.g., a quantity of cycles to be allocated to the model or to a part of the model). For example, model 410 may include a delay element (e.g., a model element that may add a quantity of delay to a signal associated with model 410). The delay element may receive a signal (e.g., an input signal), may wait a quantity of time determined by the delay element, and may provide the signal (e.g., as an output signal) to another model element.

In some implementations, the optimization may include identifying a quantity of delay associated with pipelining of model 410 (e.g., or a part of model 410). For example, a pipeline may include a set of elements (e.g., processors, threads, co-routines, or the like) arranged so that an output of a first element may be an input of a second element. A processing device (e.g., a microprocessor) may perform pipelining by starting execution of the second element before completing execution of the first element (e.g., by permitting a set of instructions in the pipeline concomitantly, with a first instruction at a different stage of execution than a second instruction). In some implementations, the pipeline may be implemented on hardware (e.g., a FPGA, an ASIC, or the like). For example, a data path (e.g., implemented on the hardware) may be partitioned into a set of functional units, with each functional unit corresponding to a stage of instruction execution. A processing device (e.g., associated with the FPGA, the ASIC, or the like) may perform pipelining by starting execution of a second functional unit in the data path (e.g., of the set of functional units) before completing execution of a first functional unit in the data path (e.g., of the set of functional units).

In some implementations, pipelining model 410 may reduce a critical path associated with model 410, may increase a clock speed associated with model 410, may reduce an amount of power consumed by model 410, or the like. Based on the pipelining, client device 210 may determine a quantity of delay to insert into model 410 (e.g., a quantity of cycles to allocate to the model).

In some implementations, the optimization may include identifying a quantity of delay associated with adding or removing a model element. For example, client device 210 may replace a model element in model 410 with a new model element. The new model element may be associated with a quantity of cycles associated with a clock rate of the system (e.g., a frequency at which a processing device associated with the system operates) that is greater than a quantity of cycles associated with the model element being replaced. Client device 210 may automatically determine an amount of cycles to allocate to model 410 based on the new model element (e.g., to adjust for the quantity of cycles associated with the new model element).

In some implementations, the optimization may include identifying a quantity of delay associated with resource sharing. For example, model 410 may include a resource (e.g., a multiplier element, an adding element, or the like) that may be used in association with two or more other model elements. Client device 210 may automatically determine an amount of delay to insert into model 410 (e.g., an amount of cycles to allocate to model 410 or a part of model 410) to allow the two or more other model elements to use the resource (e.g., at different times).

As indicated above, FIGS. 4A-4D are provided merely as an example. Other examples are possible and may differ from what was described with regard to FIGS. 4A-4D.

Figure 5A:
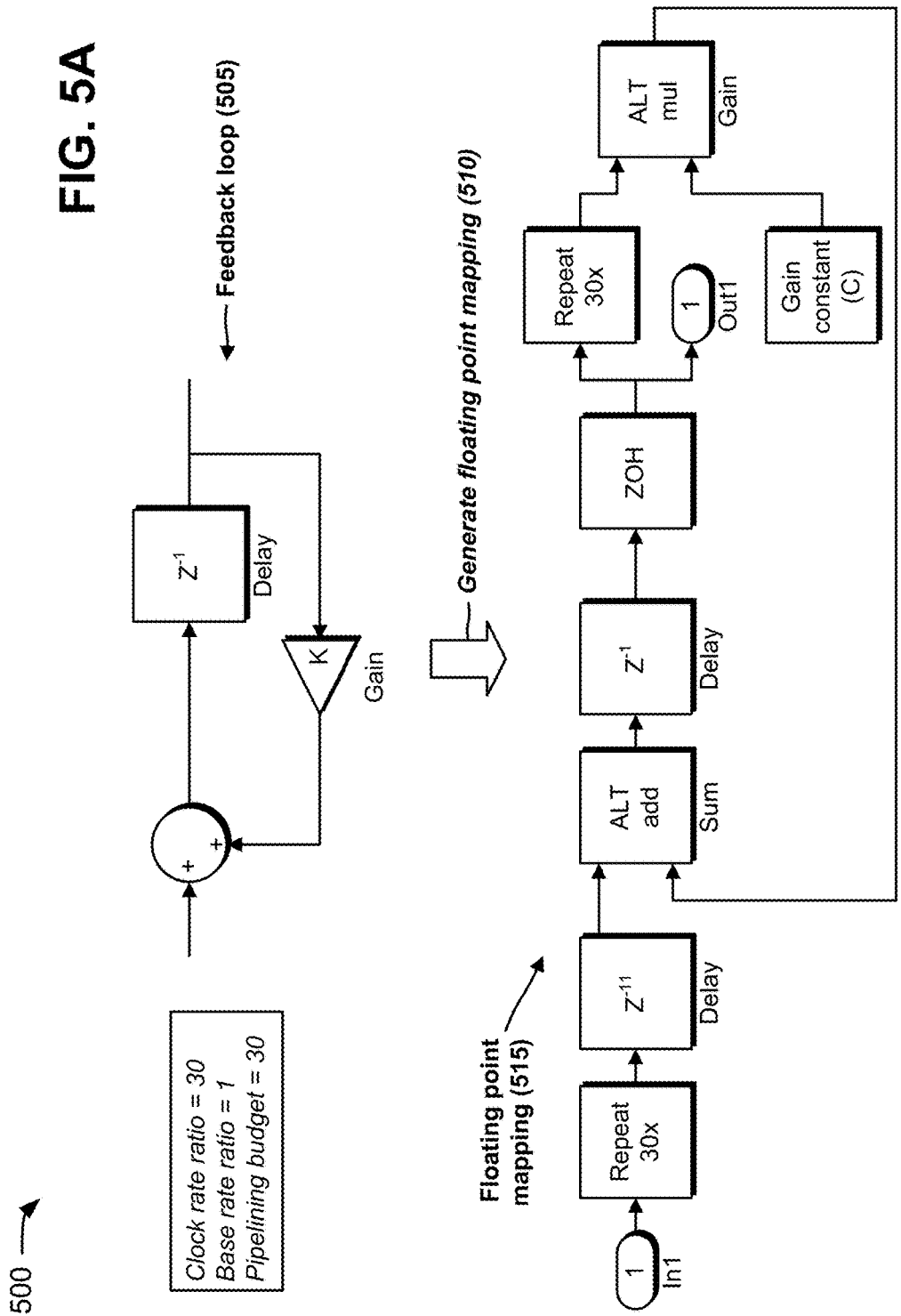
FIGS. 5A-5D are diagrams of an example implementation of determining clock rate pipelining for feedback loops and of decreasing latency associated with clock rate pipelining.

FIGS. 5A-5D are diagrams of an example implementation 500 of determining clock rate pipelining for feedback loops and of decreasing latency associated with clock rate pipelining. As shown in FIG. 5A, a model may include a feedback loop 505 with a delay block, a gain block, and an adding block. In some implementations, client device 210 may execute feedback loop 505 in one clock cycle, but HDL code generated based on feedback loop 505 may require multiple clock cycles for execution. As further shown in FIG. 5A, client device 210 may determine that feedback loop 505 includes a clock rate ratio of 30, a base rate ratio of 1, and a pipelining budget of 30 clock cycles.

In some implementations, after calculating the pipelining budget, client device 210 may generate 510 a floating point mapping 515 of feedback loop 505, and may replace feedback loop 505 with floating point mapping 515. Floating point is a method of representing an approximation of a real number in a way that can support a trade-off between range and precision. For example, as shown in FIG. 5A, floating point mapping 515 may include an input block (In1), a first upsample (Repeat) block, a first delay block ($Z^{-11}$), an adding block (ALT add), a second delay block ($Z^{-1}$), a zero-order hold (ZOH) block (e.g., a block that converts a discrete-time signal to a continuous-time signal by holding each sample value for one sample interval), a second upsample (Repeat) block, an output block (Out1), a gain constant block, and a multiplier block (ALT mul). In some implementations, floating point mapping 515 may improve a clock frequency associated with feedback loop 505. In some implementations, floating point mapping 515 may enable a dynamic system (e.g., feedback loop 505) to be mapped to and replaced by floating point.

Figure 5B:
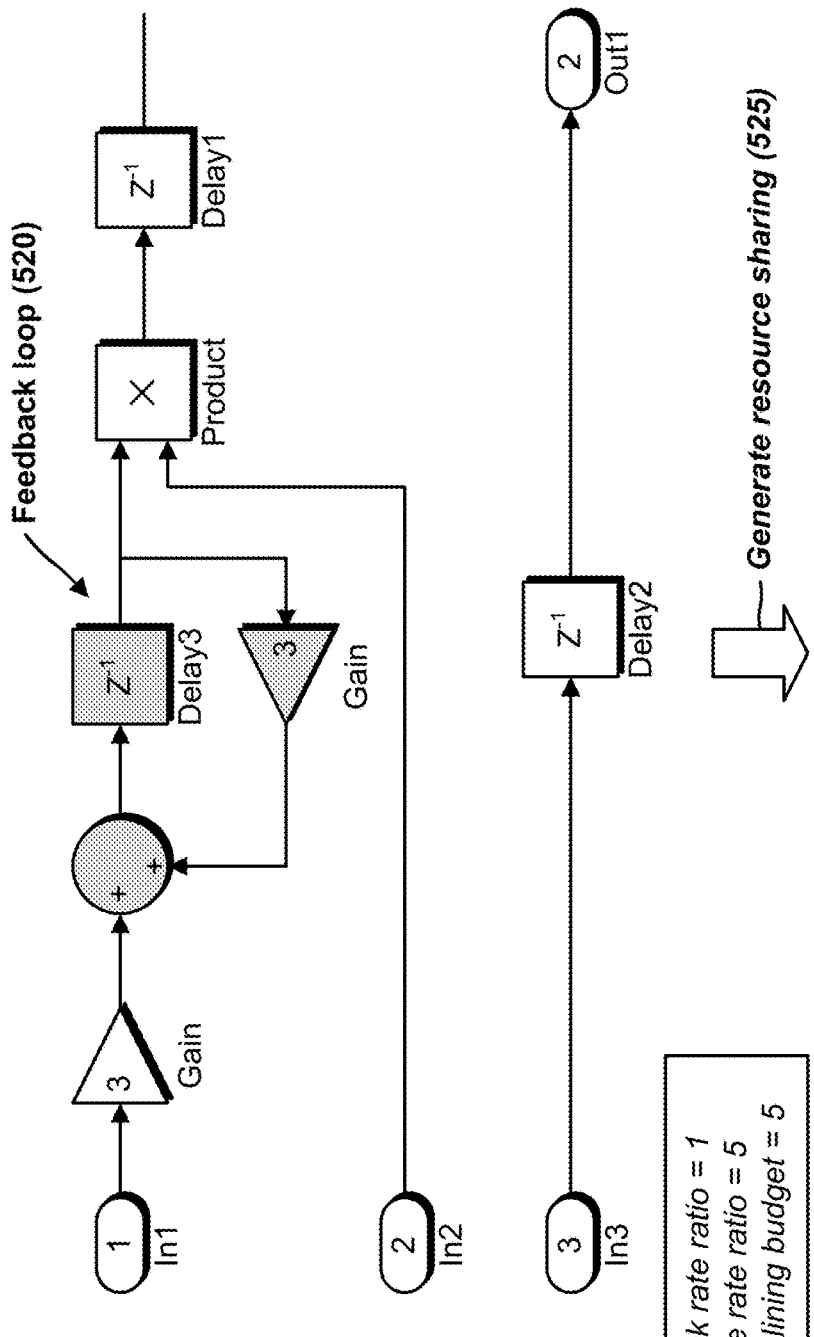

As shown in FIG. 5B, a first portion of another model may include a feedback loop 520 (shaded) with a delay block (Delay3), a gain block, and an adding block. In some implementations, client device 210 may execute feedback loop 520 in one clock cycle, but HDL code generated based on feedback loop 520 may require multiple clock cycles for execution. The first portion of the model may also include an input block (In1), another gain block, a multiplier block (Product), another delay block (Delay1), and another input block (In2). As further shown in FIG. 5B, a second portion of the model may include an input block (In3), a delay block (Delay2), and an output block (Out1). Client device 210 may determine that the model includes a clock rate ratio of 1, a base rate ratio of 5, and a pipelining budget of 5 clock cycles.

Figure 5C:
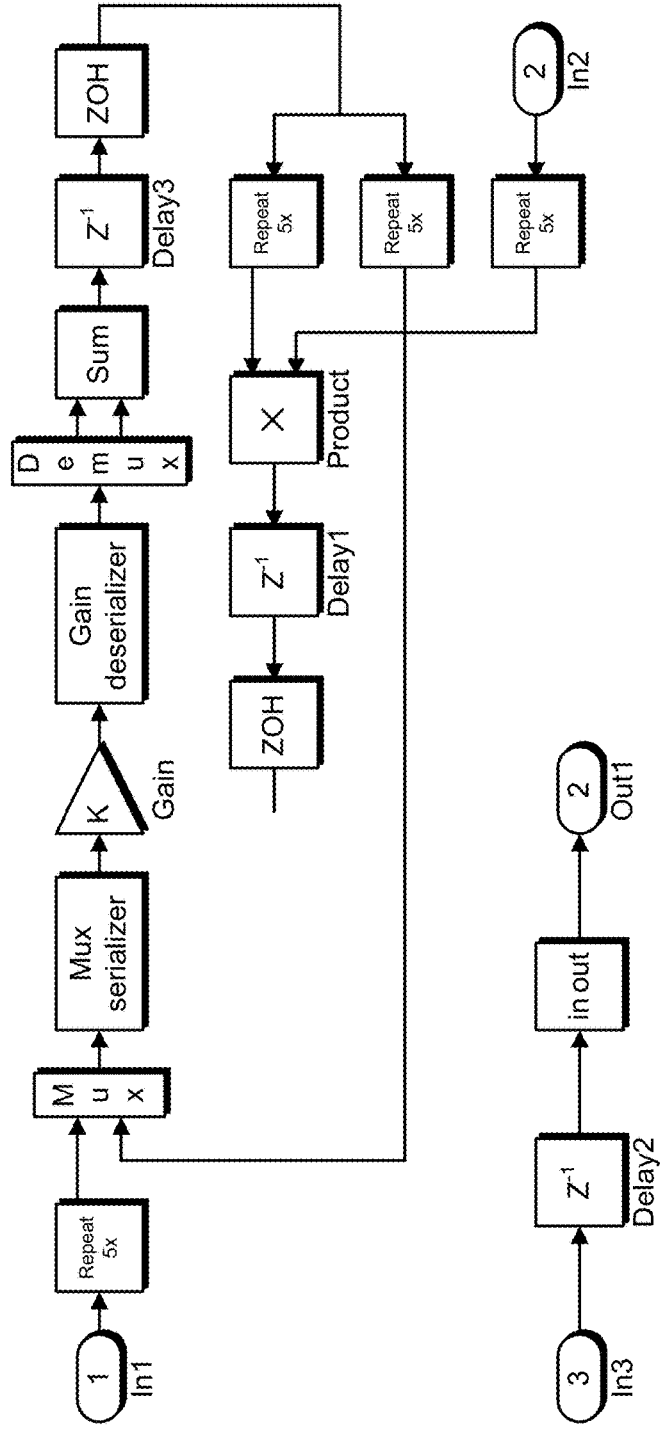

In some implementations, after calculating the pipelining budget, client device 210 may generate 525 a resource sharing model 530 based on the model, as shown in FIGS. 5B and 5C. In some implementations, resource sharing model 530 may modify and replace the model, and may improve a clock frequency associated with the model and/or feedback loop 520 by utilizing resource sharing in feedback loop 520. In some implementations, the model may include one or more resources (e.g., multiplier blocks, adding blocks, or the like) that may be used in association with two or more other model blocks. Client device 210 may automatically modify the model to include additional blocks that may utilize the one or more resources of the model (e.g., resource sharing). For example, as shown in FIG. 5C, client device 210 may add upsample (Repeat) blocks, a multiplexer block, a multiplexer serializer block, a gain constant block (K), a gain deserializer block, a demultiplexer block, a sum block, and ZOH blocks to the first portion of the model, and may add an input/output block to the second portion of the model.

Figure 5D:
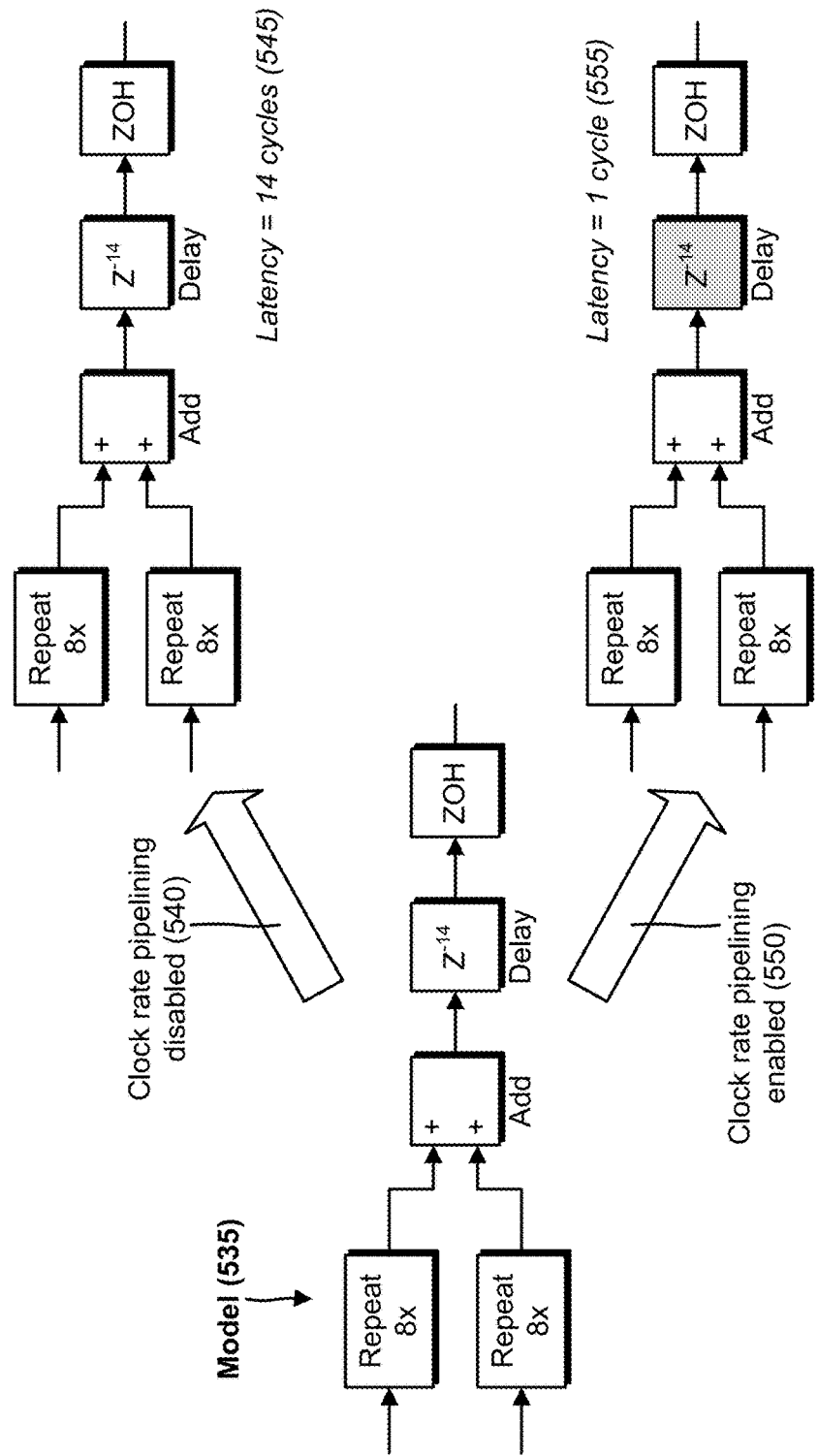

As shown in FIG. 5D, a model 535 may include two upsample (Repeat) blocks, an adding block, a delay block, and a ZOH block. In some implementations, client device 210 may disable clock rate pipelining in model 535. Alternatively, or additionally, client device 210 may enable clock rate pipelining in model 535. If client device 210 disables clock rate pipelining, as indicated by reference number 540, client device 210 may require fourteen (14) clock cycles (e.g., latency) to execute model 535, as indicated by reference number 545. If client device 210 enables clock rate pipelining, as indicated by reference number 550, client device 210 may modify the delay block of model 535 for clock rate pipelining. With clock rate pipelining enabled, client device 210 may require one (1) clock cycle (e.g., latency) to execute model 535 (e.g., by reducing a delay associated with model 535 from 14 clock cycles to 1 clock cycle), as indicated by reference number 555 in FIG. 5D. Thus, an amount of latency associated with executing model 535 with clock rate pipelining may be less than an amount of latency associated with executing model 535 without clock rate pipelining.

As indicated above, FIGS. 5A-5D are provided merely as an example. Other examples are possible and may differ from what was described with regard to FIGS. 5A-5D.

Figure 6A:
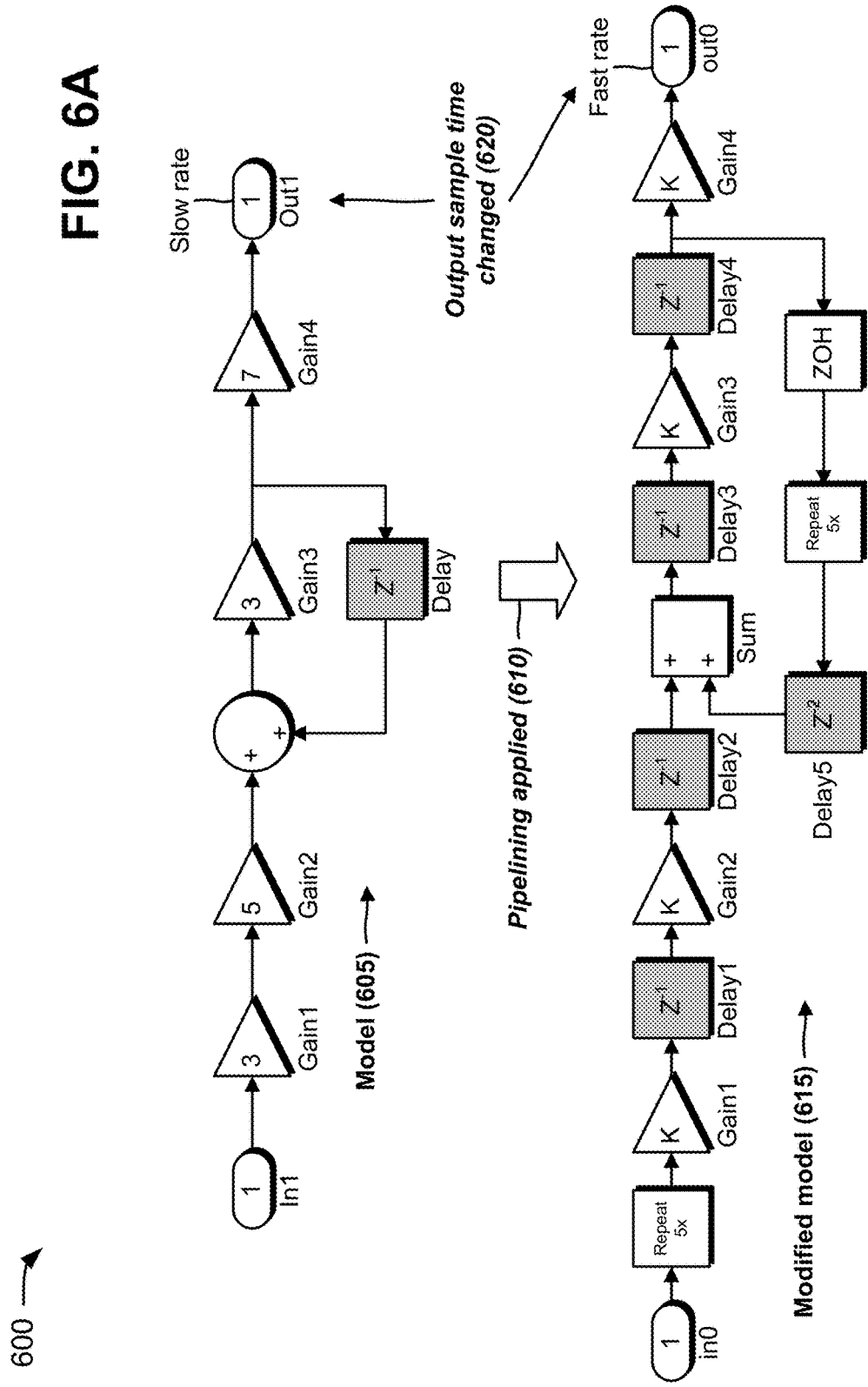
FIGS. 6A-6D are diagrams of an example implementation of generating a validation model for verification of clock rate pipelining.

FIGS. 6A-6D are diagrams of an example implementation 600 of generating a validation model for verification of clock rate pipelining. As shown in FIG. 6A, a model 605 may include an input block (In1), a first gain block (Gain1), a second gain block (Gain2), an adding block, a third gain block (Gain3), a delay block provided in a feedback loop, a fourth gain block (Gain4), and an output block (Out1). In some implementations, model 605 may execute at a sample rate (e.g., a slow rate). In some implementations, client device 210 may apply clock rate pipelining to the delay block of model 605, as indicated by reference number 610. By applying clock rate pipelining to the delay block of model 605, client device 210 may generate a modified model 615 (e.g., a HDL-optimized model), as further shown in FIG. 6A. In some implementations, client device 210 may provide additional blocks to model 605 in order to generate modified model 615. For example, modified model 615 may include the blocks of model 605, and may also include two upsample (Repeat) blocks, five delay blocks (Delay1, Delay2, Delay3, Delay4, and Delay5), and a ZOH block in order to implement the clock rate pipelining. However, the clock rate pipelining may cause modified model 615 to execute at a clock rate (e.g., a rate faster than the sample rate of model 605) so that output sample times of model 605 and modified model 615 may differ, as indicated by reference number 620 in FIG. 6A.

Figure 6B:
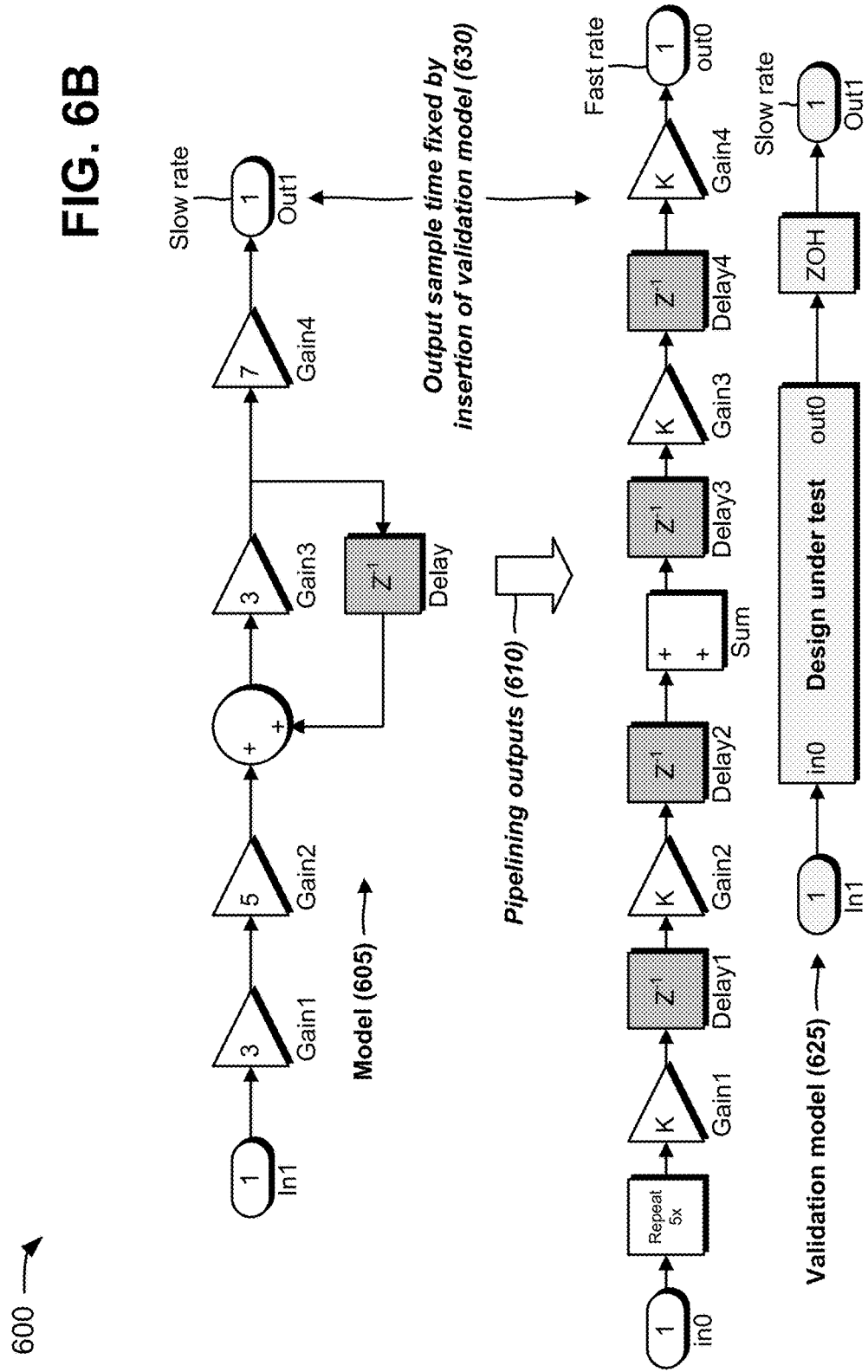
Figure 6C:
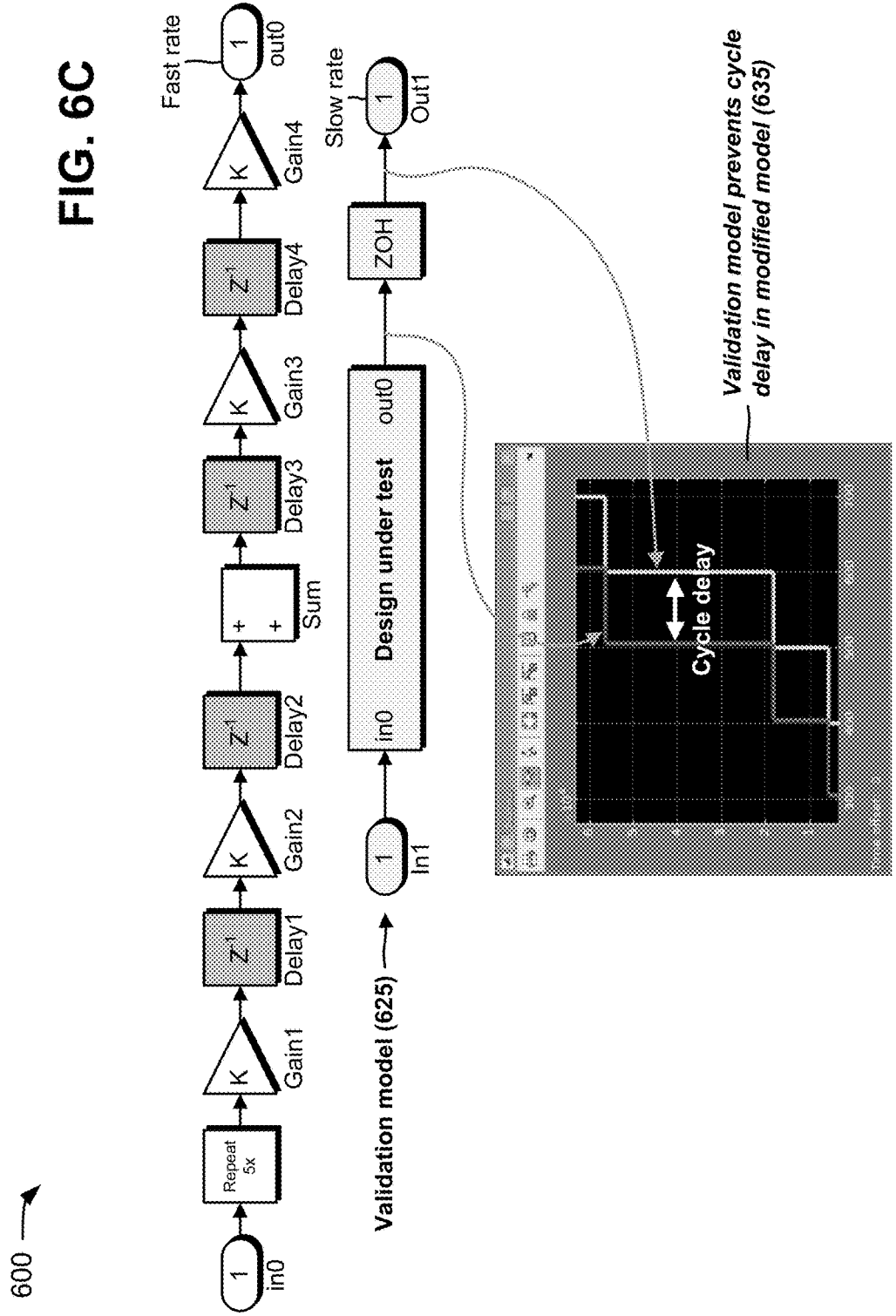

In some implementations, the different output sample times may prevent client device 210 from testing model 605 and/or modified model 615, such as by performing a verification of model 605 and/or modified model 615. In some implementations, client device 210 may correct the difference between the output sample times of model 605 and modified model 615 by utilizing a validation model 625 in place of modified model 615 (e.g., the feedback portion of modified model 615), as shown in FIG. 6B. In some implementations, validation model 625 may include the input block (In1), a design under test block, a ZOH block, and the output block (Out1). In some implementations, validation model 625 may include a rate transition model that executes at the sample rate (e.g., the slow rate) of model 605 so that the output sample time of model 605 may be the same as the output sample time of validation model 625, as indicated by reference number 630 in FIG. 6B. In some implementations, validation model 625 may reduce latency associated with execution of modified model 615, and may enable modified model 615 to be executed more quickly. For example, as indicated by reference number 635 in FIG. 6C, validation model 625 may prevent a cycle delay (e.g., of about 95 cycles) in modified model 615, which may reduce latency associated with execution of modified model 615.

When the output sample times of model 605 and validation model 625 are the same, client device 210 may utilize validation model 625 to test (e.g., verify) model 605 and/or modified model 615. In some implementations, model 605 and/or modified model 615 may be tested/verified in order to validate requirements, identify errors, verify design requirements, verify behavior, or the like associated with model 605, modified model 615, and/or a system represented by model 605.

Figure 6D:
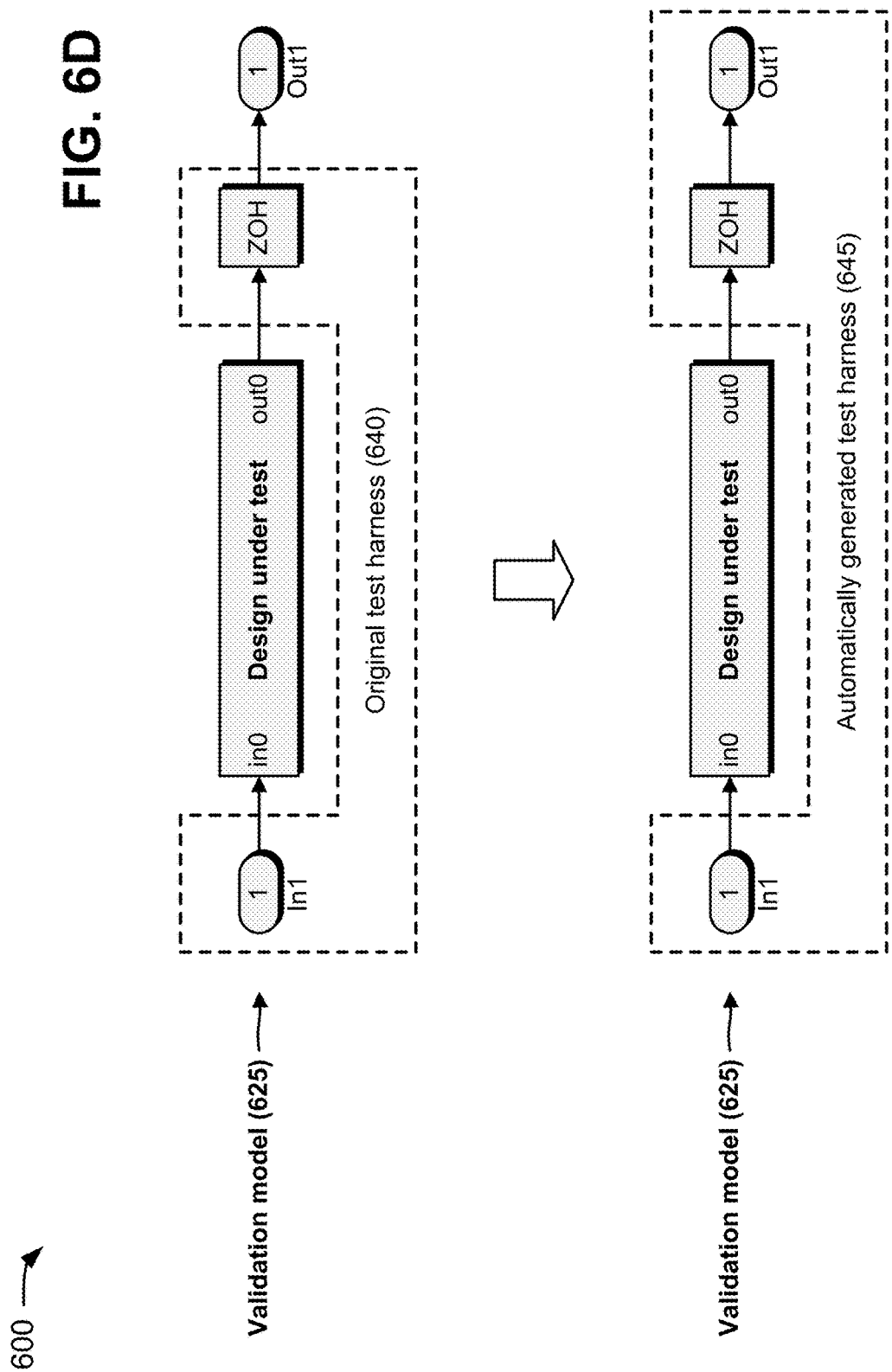

In some implementations, client device 210 may utilize a generic test harness 640 (e.g., that may be used by all models) with validation model 625 in order to test model 605 and/or modified model 615, as shown in FIG. 6D. A test harness may include a collection of software and test data configured to test a program unit by executing the program unit under varying conditions and by monitoring a behavior and outputs of the program unit. In some implementations, client device 210 may automatically generate a test harness 645 that extends generic test harness 640 to include rate transitions (e.g., between the fast rate and the slow rate), such as the output block (Out1), as further shown in FIG. 6D. In some implementations, client device 210 may utilize automatically generated test harness 645 with validation model 625 in order to test model 605 and/or modified model 615. Thus, if clock rate pipelining is utilized and affects output sample times, automatically generated test harness 645 may enable utilization of test benches and/or model verification techniques for testing and/or verifying model 605 and/or modified model 615. For example, automatically generated test harness 645 may be utilized with test benches and/or model verification techniques applied to clock rate pipelined models and/or non-clock rate pipelined models.

As indicated above, FIGS. 6A-6D are provided merely as an example. Other examples are possible and may differ from what was described with regard to FIGS. 6A-6D.

Figure 7A:
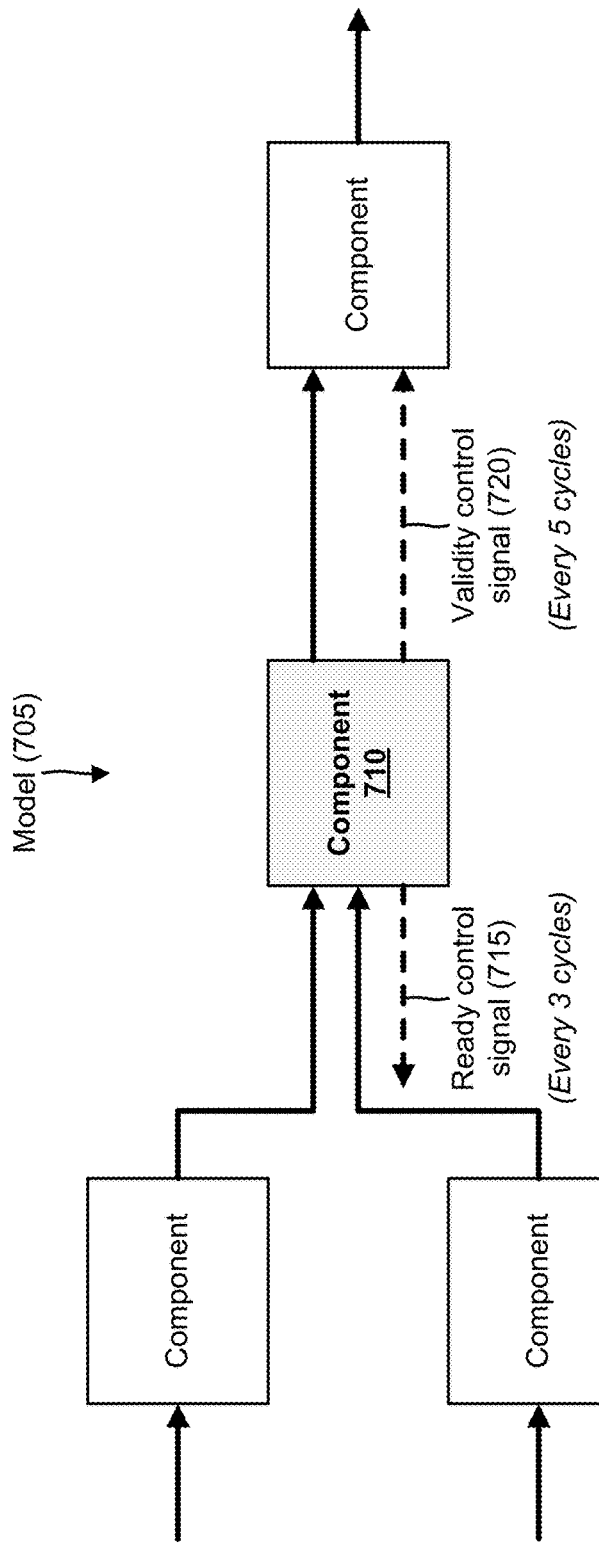
FIGS. 7A-7D are diagrams of an example implementation of applying clock rate pipelining in the presence of control signals.
Figure 7B:
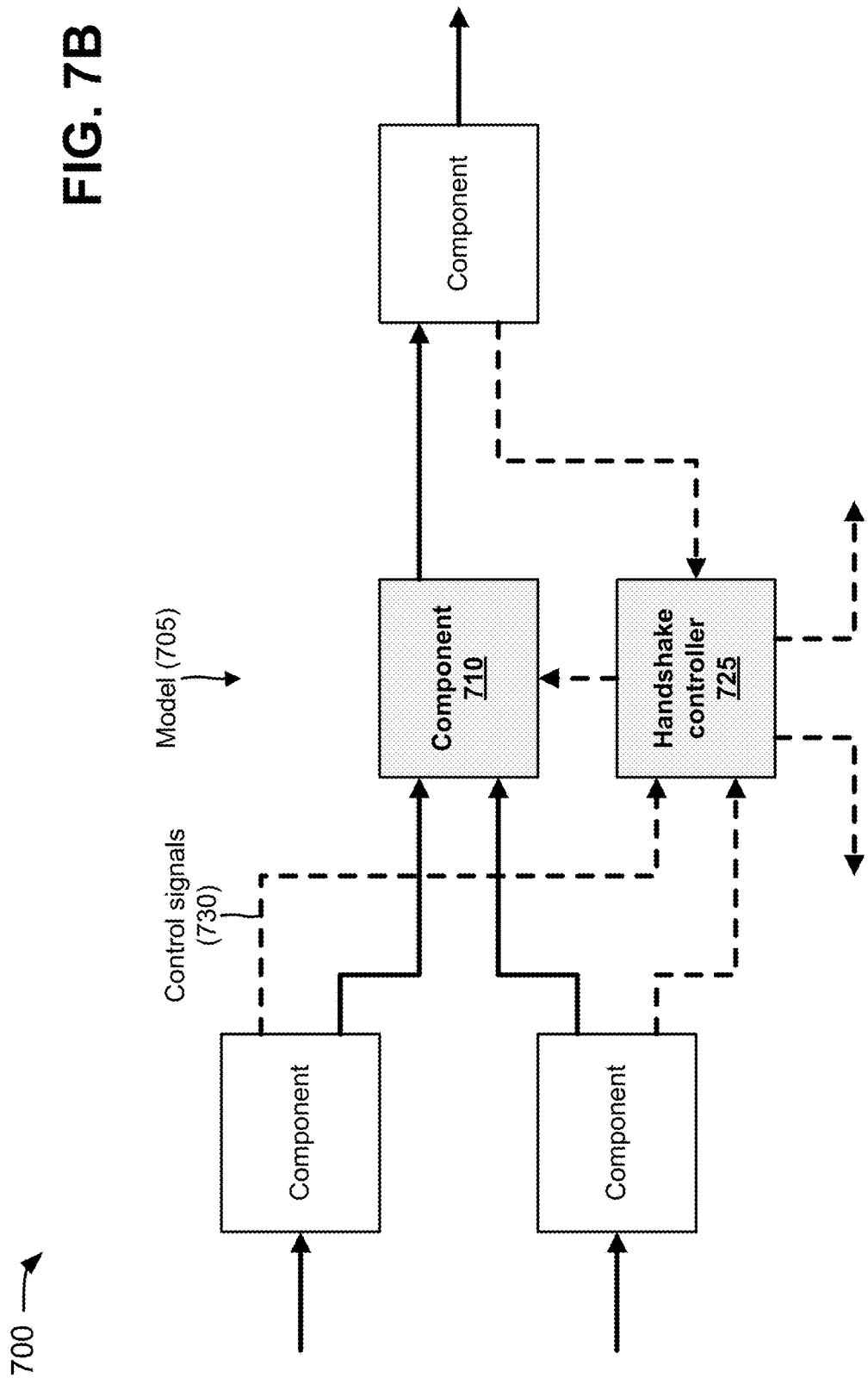

FIGS. 7A-7D are diagrams of an example implementation 700 of applying clock rate pipelining in the presence of control signals. As shown in FIGS. 7A and 7B, models may include control signals that are used to control passage of data among components of the models. For example, as shown in FIG. 7A, a model 705 may include component blocks, and a particular component block 710 may generate multiple control signals. In some implementations, component block 710 may generate a ready control signal 715 that includes information indicating, to upstream component blocks (e.g., the component blocks to the left of component block 710), whether component block 710 is ready for new data. In some implementations, component block 710 may generate ready control signal 715 after a particular number of clock cycles (e.g., every three clock cycles). In some implementations, component block 710 may generate a validity control signal 720 that includes information indicating, to downstream component blocks (e.g., the component block to the right of component block 710), that data provided by component block 710 is valid. In some implementations, component block 710 may generate validity control signal 720 after a particular number of clock cycles (e.g., every five clock cycles). In some implementations, data may be included with ready control signal 715 and/or validity control signal 720. In some implementations, ready control signal 715 and/or validity control signal 720 may affect operation of dependent component blocks. In some implementations, ready control signal 715 and/or validity control signal 720 may affect testing and/or verification of model 705.

In some implementations, as shown in FIG. 7B, a component block (e.g., component block 710) may be associated with and/or include a handshake controller 725 that generates, receives, and/or sends control signals 730, such as ready control signal 715 and/or validity control signal 720. In some implementations, handshake controller 725 may utilize a protocol (e.g., a handshake protocol) that describes how to process data, such as when and from where to receive data, whether data is valid, whether and when to send valid data to other components, or the like. In some implementations, handshake controller 725 may generate, receive, and/or send control signals 730 based on a condition being satisfied, an event occurring, or the like. In some implementations, handshake controller 725 may reset a state associated with model 705 and/or component(s) of model 705. In some implementations, handshake controller 725 may initiate a computation by model 705 and/or component(s) of model 705.

Figure 7C:
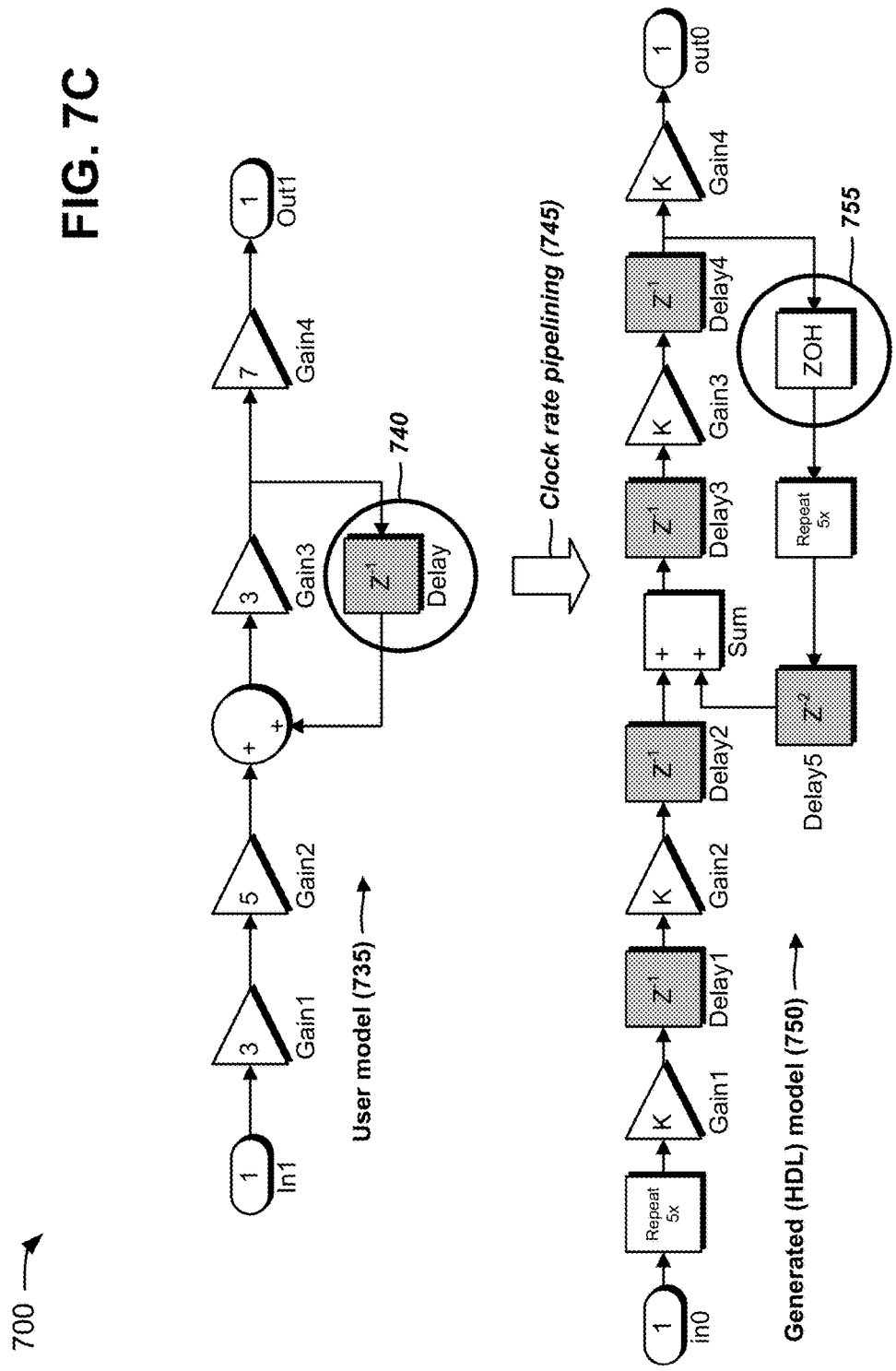

As shown in FIG. 7C, a user model 735 may include an input block (In1), a first gain block (Gain1), a second gain block (Gain2), an adding block, a third gain block (Gain3), a delay block 740 provided in a feedback loop, a fourth gain block (Gain4), and an output block (Out1). In some implementations, user model 735 may execute at a sample rate (e.g., a slow rate). In some implementations, client device 210 may apply clock rate pipelining to delay block 740 of user model 735, as indicated by reference number 745. By applying clock rate pipelining to delay block 740, client device 210 may generate a HDL model 750, as further shown in FIG. 7C. In some implementations, client device 210 may provide additional blocks to user model 735 in order to generate HDL model 750. For example, HDL model 750 may include the blocks of user model 735 (e.g., but the different gain values may have turned into one value K), and may also include two upsample (Repeat) blocks, five delay blocks (Delay1, Delay2, Delay3, Delay4, and Delay5), and a ZOH block 755 in order to implement the clock rate pipelining. However, the clock rate pipelining may cause delay block 740 of user model 735 to turn into a rate transition at ZOH block 755. In other words, all of the blocks of HDL model 750 may execute at a clock rate (e.g., a rate faster than the sample rate of user model 735), except for ZOH block 755 which may execute at the sample rate (e.g., a slow rate).

Figure 7D:
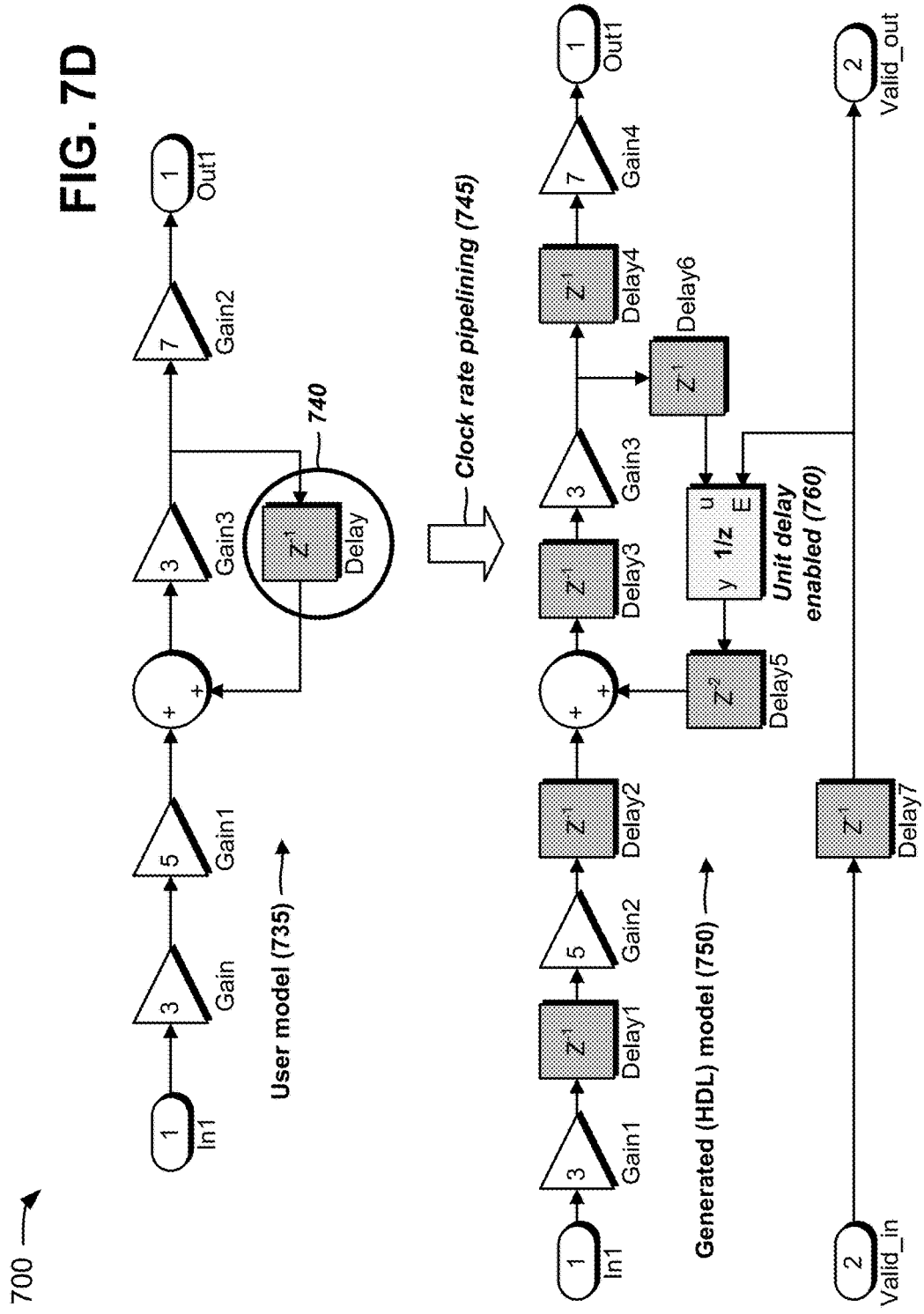

In some implementations, in order to correct the rate transition at ZOH block 755, client device 210 may replace ZOH block 755 with additional blocks in HDL model 750, as shown in FIG. 7D. For example, a sixth delay block (Delay6) and a unit delay block 760 may be added to a portion of HDL model 750. Unit delay block 760 may be controlled based on validity control signals associated with a second input block (Valid_in), a seventh delay block (Delay7), and a second output block (Valid_out), which are also added to HDL model 750. In some implementations, the validity control signals may enable and/or disable operation of unit delay block 760 so that unit delay block 760 may execute at the clock rate rather than at the sample rate. This may correct the rate transition and may enable all of the blocks of HDL model 750 to execute at the clock rate.

As indicated above, FIGS. 7A-7D are provided merely as an example. Other examples are possible and may differ from what was described with regard to FIGS. 7A-7D.

FIG. 8 is a flow chart of an example process 800 for utilizing clock rate pipelining in a model for a multi-rate system. In some implementations, one or more process blocks of FIG. 8 may be performed by client device 210. In some implementations, one or more process blocks of FIG.

8 may be performed by another device or a group of devices separate from or including client device 210, such as server device 230.

As shown in FIG. 8, process 800 may include receiving and/or creating a model of a multi-rate system (block 810). For example, as described above in connection with FIG. 4B, client device 210 (e.g., via TCE 220) may create and/or receive model 410 that is based on multi-rate system 405. In some implementations, client device 210 may receive model 410 from a storage device (e.g., memory 330 and/or storage component 340, FIG. 3). In some implementations, client device 210 (e.g., TCE 220) may receive model 410. Additionally, or alternatively, client device 210 (e.g., TCE 220) may receive model 410 based on a user creating model 410. For example, a user may cause client device 210 to create or open a user interface. The user may then add one or more model blocks and/or model elements to the user interface to create model 410. For example, in some implementations, client device 210 may receive a command, from the user, that indicates that a model block and/or a model element is to be added to the user interface. Client device 210 may receive the command based, for example, on detecting a selection of a particular menu item, entry of a particular textual or audible input from the user, and/or entry of some other predetermined input that indicates a desire to add a model block and/or a model element to the user interface. As another example, client device 210 may receive input (e.g., a drag and drop) that indicates that a model block and/or a model element, included in a block library and/or a model element library associated with TCE 220, is to be added to the user interface. Based on the command, client device 210 may add the model block and/or the model element to the user interface.

As further shown in FIG. 8, process 800 may include identifying a clock rate of the multi-rate system based on the model (block 820). For example, as described above in connection with FIGS. 4B and 4C, client device 210 may identify the clock rate of multi-rate system 405 based on information associated with model 410 (e.g., user inputs for model 410, information associated with blocks of model 410, or the like). In some implementations, client device 210 may determine the sample rate, the clock rate, and the base time for model 410, and may determine a pipelining budget for model 410 based on the sample rate, the clock rate, and the base time associated with model 410. In some implementations, client device 210 may calculate the pipelining budget based on computation of a clock rate ratio and a base rate ratio for model 410. For example, client device 210 may calculate the clock rate ratio by dividing the base time by the clock rate. Client device 210 may calculate the base rate ratio by dividing the sample rate by the base time. Client device 210 may calculate the pipelining budget by multiplying the clock rate ratio and the base rate ratio.

As further shown in FIG. 8, process 800 may include identifying slow-rate paths of the multi-rate system that can be optimized by clock rate pipelining (block 830). For example, as described above in connection with FIG. 4D, client device 210 may automatically identify the design delays in model 410 and the pipeline delays associated with model 410. In some implementations, client device 210 may identify the design delays in model 410, such as delay blocks, filters, discrete transfer functions, persistent variables, states, or the like, and/or may identify the design delays updated at the sample rate (e.g., the slow rate). In some implementations, client device 210 may identify the pipeline delays introduced by HDL implementations (e.g., and balanced by delay balancing), the pipeline delays associated with model 410 (e.g., input/output pipeline delays, floating point pipelines, sharing/streaming, RAM mapping, or the like), and/or the pipeline delays updated at the clock rate (e.g., the fast rate).

As further shown in FIG. 8, process 800 may include utilizing the clock rate pipelining to insert sample rate delays in the model of the multi-rate system (block 840). For example, as described above in connection with FIG. 4D, client device 210 may apply clock rate pipelining to address the design delays in model 410 (e.g., delay blocks, filters, discrete transfer functions, persistent variables, states, or the like) and/or to address the design delays updated at the sample rate (e.g., the slow rate). In some implementations, client device 210 may apply clock rate pipelining to address the pipeline delays introduced by HDL implementations, the pipeline delays associated with model 410 (e.g., input/output pipeline delays, floating point pipelines, sharing/streaming, RAM mapping, or the like), and/or the pipeline delays updated at the clock rate (e.g., the fast rate). In some implementations, the clock rate pipelining may be applied to input/output pipelining, distributed pipelining, RAM mapping, resource sharing, streaming, loop streaming, iterative numerical algorithms, multi-cycle HDL implementations (e.g., floating-point mapping), or the like. In some implementations, another type of optimization may be applied to model 410, such as, for example, resource sharing, adding model elements associated with additional delay, or the like. In some implementations, the optimization may include modifying model 410 to reduce an amount of hardware needed, to increase a speed of multi-rate system 405, to remove redundancy, or the like.

In another example, as described above in connection with FIG. 7D, in order to correct the rate transition at ZOH block 755, client device 210 may replace ZOH block 755 with additional blocks in HDL model 750. For example, a sixth delay block (Delay6) and a unit delay block 760 may be added to a portion of HDL model 750. Unit delay block 760 may be controlled based on validity control signals associated with a second input block (Valid_in), a seventh delay block (Delay7), and a second output block (Valid_out), which are also added to HDL model 750. In some implementations, the validity control signals may enable and/or disable operation of unit delay block 760 so that unit delay block 760 may execute at the clock rate rather than at the sample rate. This may correct the rate transition and may enable all of the blocks of HDL model 750 to execute at the clock rate.

As further shown in FIG. 8, process 800 may include generating a validation model and/or a test harness for verification of the clock rate pipelining (block 850). For example, as described above in connection with FIGS. 6B and 6D, client device 210 may correct the difference between the output sample times of model 605 and modified model 615 by utilizing validation model 625 in place of modified model 615. Validation model 625 may include a rate transition model that executes at the sample rate (e.g., the slow rate) of model 605 so that the output sample time of model 605 may be the same as the output sample time of validation model 625. Client device 210 may utilize validation model 625 to test (e.g., verify) model 605 and/or modified model 615. In some implementations, client device 210 may automatically generate test harness 645 that extends generic test harness 640 to include rate transitions (e.g., between the fast rate and the slow rate). In some implementations, client device 210 may utilize automatically generated test harness 645 with validation model 625 in order to test model 605 and/or modified model 615. For example, automatically generated test harness 645 may be utilized with test benches and/or model verification techniques applied to clock rate pipelined models and/or non-clock rate pipelined models.

As further shown in FIG. 8, process 800 may include applying the clock rate pipelining with control signals of the model of the multi-rate system (block 860). For example, as described above in connection with FIG. 7D, in order to correct the rate transition at ZOH block 755, client device 210 may replace ZOH block 755 with additional blocks in HDL model 750, such as the sixth delay block (Delay6) and unit delay block 760. Unit delay block 760 may be controlled based on validity control signals associated with the second input block (Valid_in), the seventh delay block (Delay7), and the second output block (Valid_out). In some implementations, the validity control signals may enable and/or disable operation of unit delay block 760 so that unit delay block 760 may execute at the clock rate rather than at the sample rate. This may correct the rate transition and may enable all of the blocks of HDL model 750 to execute at the clock rate.

In some implementations, a control signal-based generation may be optional and process block 860 may be omitted. For example, whether or not the user requests control signals, client device 210 may generate code and the validation model with or without the control signals.

Although FIG. 8 shows example blocks of process 800, in some implementations, process 800 may include additional blocks, fewer blocks, different blocks, or differently arranged blocks than those depicted in FIG. 8. For example, process 800 may include client device 210 generating code based on the model and the applied clock rate pipelining. Additionally, or alternatively, two or more of the blocks of process 800 may be performed in parallel.

Systems and/or methods, described herein, may utilize clock rate pipelining to generate an optimized model (e.g., code) for a multi-rate system. The systems and/or methods may automatically recognize a rate differential in a model of a multi-rate system, and may automatically insert a quantity of delay (e.g., clock rate pipelines) into portions of the model without affecting the overall behavioral characteristics of the model and/or the portions of the model (e.g., without altering the latency of the model).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may be automatically executed (e.g., C code, C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, or the like); text files that may be executed in conjunction with other executables (e.g., Python text files, a collection of dynamic-link library (DLL) files with text-based combining, configuration information that connects pre-compiled modules, an extensible markup language (XML) file describing module linkage, or the like); or the like. In one example, code may include different combinations of the above-identified classes (e.g., text-based code, binary code, text files, or the like). Alternatively, or additionally, code may include code generated using a dynamically-typed programming language (e.g., the M language, a MATLAB® language, a MATLAB-compatible language, a MATLAB-like language, or the like) that can be used to express problems and/or solutions in mathematical notations. Alternatively, or additionally, code may be of any type, such as function, script, object, or the like, and a portion of code may include one or more characters, lines, or the like, of the code.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
  receiving a model associated with a multi-rate system,
    the multi-rate system including a system associated with a first data rate and a second data rate different than the first data rate, and
    the receiving the model being performed by a device;
  identifying the first data rate of the multi-rate system based on the model,
    the identifying the first data rate being performed by the device;
  identifying a portion, of the model, associated with the second data rate,
    the identifying the portion of the model being performed by the device;
  applying pipelining to adjust the second data rate associated with the portion of the model so that the second data rate substantially equals the first data rate,
    the applying the pipelining being performed by the device; and generating code associated with the model and the applied pipelining,
the generating the code being performed by the device.

2. The method of claim 1, further comprising:
generating a validation model based on the model and the applied pipelining,
the validation model preventing a delay in the portion of the model with the applied pipelining, and
the validation model fixing an output sample time of the model; and
testing the model and the applied pipelining using the validation model.

3. The method of claim 2, further comprising:
generating a test harness for the validation model; and
where testing the model and the applied pipelining further comprises:
utilizing the test harness to test the model and the applied pipelining based on the validation model.

4. The method of claim 1, where the model includes a feedback loop and the method further comprises:
generating a floating point mapping of the feedback loop of the model; and
generating code associated with the floating point mapping.

5. The method of claim 1, where the model includes a feedback loop and the method further comprises:
applying resource sharing to the feedback loop of the model; and
generating code associated with the applied resource sharing.

6. The method of claim 1, where the portion of the model includes a control signal and the method further comprises:
applying the pipelining to transmission of the control signal by the portion of the model.

7. The method of claim 1, where:
the first data rate includes a clock rate of the multi-rate system,
the second data rate includes a sample rate of the multi-rate system, and
the pipelining includes clock rate pipelining.

8. The method of claim 1, where applying the pipelining further comprises:
calculating a pipelining budget associated with the model; and
applying the pipelining based on the pipelining budget.

9. A computer-readable medium for storing instructions, the instructions comprising:
one or more instructions that, when executed by one or more processors of a device, cause the one or more processors to:
receive a model associated with a multi-rate system,
the multi-rate system including a system associated with a first data rate and a second data rate, and
the first data rate being greater than the second data rate;
identify the first data rate of the multi-rate system based on the model;
identify at least one portion, of the model, associated with the second data rate;
apply pipelining to adjust the second data rate associated with the at least one portion of the model so that the second data rate substantially equals the first data rate; and
generate code associated with the model and the applied pipelining.

10. The computer-readable medium of claim 9, where the one or more instructions, when executed by the one or more processors, further cause the one or more processors to:
generate a validation model based on the model and the applied pipelining,
the validation model preventing a delay in the model with the applied pipelining, and
the validation model fixing an output sample time of the model; and
verify the model and the applied pipelining based on the validation model.

11. The computer-readable medium of claim 10, where the one or more instructions, when executed by the one or more processors, further cause the one or more processors to:
generate a test harness for the validation model; and
utilize the test harness to verify the model and the applied pipelining based on the validation model.

12. The computer-readable medium of claim 9, where the model includes a feedback loop and where the one or more instructions, when executed by the one or more processors, further cause the one or more processors to:
generate a floating point mapping of the feedback loop of the model; and
generate code associated with the floating point mapping.

13. The computer-readable medium of claim 9, where the model includes a feedback loop and where the one or more instructions, when executed by the one or more processors, further cause the one or more processors to:
apply resource sharing to the feedback loop of the model; and
generate code associated with the applied resource sharing.

14. The computer-readable medium of claim 9, where the at least one portion of the model includes a control signal and where the one or more instructions, when executed by the one or more processors, further cause the one or more processors to:
apply the pipelining to transmission of the control signal by the at least one portion of the model.

15. The computer-readable medium of claim 9, where:
the first data rate includes a clock rate of the multi-rate system,
the second data rate includes a sample rate of the multi-rate system, and
the pipelining includes clock rate pipelining.

16. A device, comprising:
one or more processors to:
receive a model associated with a multi-rate system,
the multi-rate system including a system associated with a clock rate and a sample rate, and
the clock rate being greater than the sample rate;
identify the clock rate of the multi-rate system based on the model;
identify a portion, of the model, associated with the sample rate;
apply clock rate pipelining to adjust the sample rate associated with the portion of the model so that the sample rate substantially equals the clock rate; and
generate code associated with the model and the applied clock rate pipelining.

17. The device of claim 16, where the one or more processors are further to:
generate a validation model based on the model and the applied pipelining,
the validation model preventing a delay in the model with the applied clock rate pipelining, and the validation model fixing an output sample time of the model;

generate a test harness for the validation model; and utilize the test harness to verify the model and the applied clock rate pipelining based on the validation model.

18. The device of claim 16, where the model includes a feedback loop and where the one or more processors are further to:

generate a floating point mapping of the feedback loop of the model; and generate code associated with the floating point mapping.

19. The device of claim 16, where the model includes a feedback loop and where the one or more processors are further to:

apply resource sharing to the feedback loop of the model; and generate code associated with the applied resource sharing.

20. The device of claim 16, where the portion of the model includes a control signal and where the one or more processors are further to:

apply the clock rate pipelining to transmission of the control signal by the portion of the model.

* * * * *